(12) United States Patent
Joshi et al.

(10) Patent No.: US 12,328,075 B2
(45) Date of Patent: Jun. 10, 2025

(54) SWITCH MODE POWER CONVERTER WITH SELECTABLE POWER PATHS

(71) Applicant: Power Integrations, Inc., San Jose, CA (US)

(72) Inventors: Rahul Prabhakar Joshi, Pleasanton, CA (US); Shruti Anand, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 331 days.

(21) Appl. No.: 18/068,445

(22) Filed: Dec. 19, 2022

(65) Prior Publication Data

US 2023/0299685 A1    Sep. 21, 2023

Related U.S. Application Data

(60) Provisional application No. 63/319,915, filed on Mar. 15, 2022.

(51) Int. Cl.
*H02M 3/335*    (2006.01)

(52) U.S. Cl.
CPC .... *H02M 3/33569* (2013.01); *H02M 3/33561* (2013.01)

(58) Field of Classification Search
CPC ......... H02M 3/33569; H02M 3/33507; H02M 3/33561
USPC .......................................................... 363/15
See application file for complete search history.

(56) References Cited

U.S. PATENT DOCUMENTS

| 9,236,912 B2* | 1/2016 | Sun ........................... H04B 5/79 |
| 9,438,131 B2* | 9/2016 | Lee .......................... H02M 7/04 |
| 10,033,284 B2 | 7/2018 | Werner et al. |
| 10,141,765 B2 | 11/2018 | Balakrishnan et al. |
| 10,277,136 B2 | 4/2019 | Werner et al. |
| 10,505,458 B1 | 12/2019 | Pastore et al. |
| 2017/0186576 A1* | 6/2017 | Cao .................... H03K 19/0008 |
| 2020/0195163 A1* | 6/2020 | Wang ..................... H02M 1/425 |
| 2020/0313561 A1* | 10/2020 | Moore .............. H02M 3/33561 |
| 2020/0358361 A1* | 11/2020 | Pastore ............. H02M 3/33523 |
| 2024/0072663 A1* | 2/2024 | Tjanaka ................... H02J 1/102 |

FOREIGN PATENT DOCUMENTS

CN            218006124 U    12/2022

* cited by examiner

*Primary Examiner* — Yemane Mehari
(74) *Attorney, Agent, or Firm* — ArentFox Schiff LLP

(57) ABSTRACT

A switch mode power converter with selectable power paths is described herein. The switch mode power converter comprises a plurality of stacked secondary windings and secondary side circuitry. The plurality of stacked secondary windings comprises a first winding and a second winding. Additionally, the secondary side circuitry comprises a first power path, a second power path, and a power multiplexer (MUX). The first power path is electrically coupled to the first winding; and the second power path is electrically coupled to the second winding. The power MUX is configured to select and transition between the first power path and the second power path to provide a single output power path to a load.

32 Claims, 22 Drawing Sheets

SWITCH MODE POWER CONVERTER WITH SELECTABLE POWER PATHS

CROSS-REFERENCE TO RELATED APPLICATIONS

This application claims priority to U.S. Provisional Application No. 63/319,915, filed on Mar. 15, 2022, the contents of which are incorporated herein by reference in their entirety.

FIELD OF THE DISCLOSURE

The present invention relates to a switch mode power converter for selectively providing power to a load and more specifically to a switch mode power converter for selectively providing power from a multi-winding secondary.

BACKGROUND INFORMATION

Many electronic devices, such as cell phones, laptops, etc., are powered by direct current (dc) power derived from a power supply. Conventional wall outlets generally deliver a high voltage alternating current (ac) power that needs to be converted to regulated dc power in order to be used as a power source for consumer electronic devices. Switch mode power converters, also referred to as switch mode power supplies (SMPSs), are commonly used due to their high efficiency, small size, and low weight to convert a high voltage ac power to a regulated dc power.

Switch mode power converters may deliver power via a universal serial bus (USB) cable to a load. The standard power range (SPR) specification allows up to one-hundred watts (100 W) maximum with voltages as high as twenty-one volts (21V). The extended power range (EPR) specification allows up to two-hundred forty watts (240 W) maximum with voltages as high forty-eight volts (48V).

BRIEF DESCRIPTION OF THE DRAWINGS

Non-limiting and non-exhaustive embodiments of a switch mode power converter with selectable power paths are described with reference to the following figures, wherein like reference numerals refer to like parts throughout the various views unless otherwise specified.

Figure 1A:
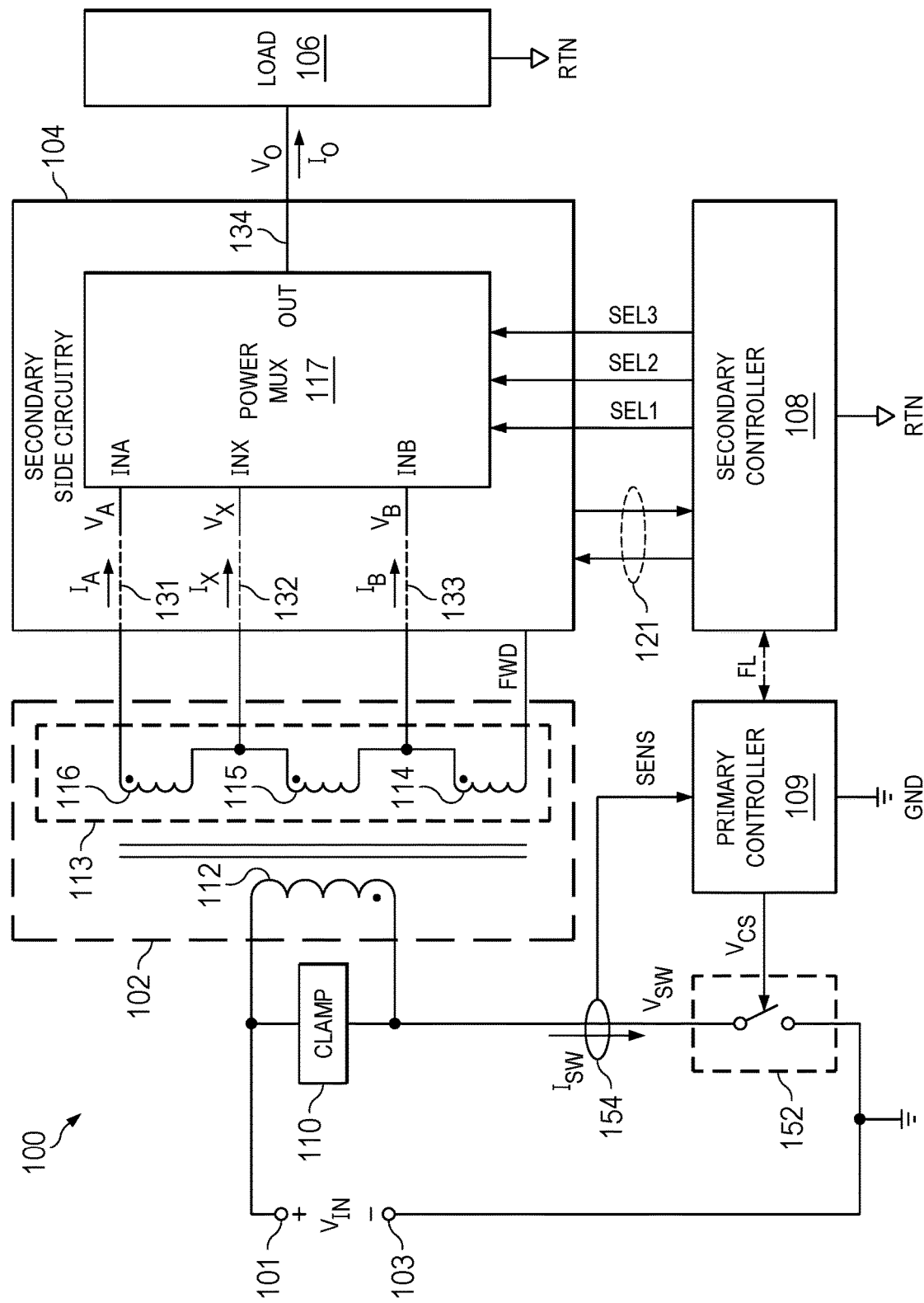
FIG. 1A illustrates a switch mode power converter for delivering power to a load according to a first embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the teachings herein. Also, common but well-understood elements that are useful or necessary in a commercially feasible embodiment are often not depicted in order to facilitate a less obstructed view of these various embodiments of a switch mode power converter with selectable power paths.

DETAILED DESCRIPTION

In the following description, numerous specific details are set forth in order to provide a thorough understanding of a switch mode power converter with selectable power paths. It will be apparent, however, to one having ordinary skill in the art that the specific detail need not be employed to practice the teachings herein. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of a multiple output switch-mode power converter system. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a logic circuit, or other suitable components that provide the described functionality. In addition, it is appreciated that the figures provided herewith are for explanation purposes to persons ordinarily skilled in the art and that the drawings, including waveforms, are not necessarily drawn to scale.

In the context of the present application, when a transistor is in an "off-state" or "off" the transistor blocks current and/or does not substantially conduct current. Conversely, when a transistor is in an "on-state" or "on" the transistor is able to substantially conduct current. By way of example, in one embodiment, a high-voltage transistor comprises an N-channel metal-oxide-semiconductor (NMOS) field-effect transistor (FET) with the high-voltage being supported between the first terminal, a drain, and the second terminal, a source. In some embodiments an integrated controller circuit may be used to drive a power switch when regulating energy provided to a load. Also, for purposes of this disclosure, "ground" or "ground potential" refers to a reference voltage or potential against which all other voltages or potentials of an electronic circuit or integrated circuit (IC) are defined or measured. Additionally, according to power electronics theory (i.e., power is related to the rate of change of energy), "power" transfer may be implied by "energy" transfer; conversely, "energy" transfer may be implied by "power" transfer.

A power converter according to the present disclosure may include primary and secondary controllers that are galvanically isolated (e.g., isolated by a communication link). Additionally, the primary controller and the secondary controller may be galvanically isolated from one another; and the secondary controller may transmit signals to the primary controller to control how the primary controller switches the power switch. For example, the secondary controller may transmit signals to the primary controller in response to a sensed output quantity of the power converter.

The primary and secondary controllers may operate to regulate an output quantity (e.g., voltage and/or current) of the power converter that is delivered to a load. For example, the primary and secondary controllers may operate to regulate the output voltage of the power converter to a desired output voltage value in response to a sensed output voltage. Although the primary and secondary controllers may regulate the output voltage in response to a sensed output voltage, in some examples, the primary and secondary controllers may regulate the output voltage and/or the output current of the power converter in response to a sensed output voltage and/or a sensed output current.

As mentioned above, switch mode power converters may deliver power via a universal serial bus (USB) cable to a load. Power delivery to a USB type-C, also referred to as USB-C, load may be based on multiple USB-C power specifications. Also as mentioned above, a load may demand power according to a standard power range (SPR) specification allowing up to one-hundred watts (100 W) maximum. Alternatively, and additionally, a USB-C load may demand power according to an extended power range (EPR) specification allowing up to two-hundred forty watts (240 W) maximum.

Accordingly, there is a need for a switch mode power converter which can provide power to a USB-C load under SPR and EPR load demand.

A switch mode power converter with selectable power paths is described herein. The switch mode power converter comprises a plurality of stacked secondary windings and secondary side circuitry. The plurality of stacked secondary windings comprises a first winding and a second winding. Additionally, the secondary side circuitry comprises a first power path, a second power path, and a power multiplexer (MUX). The first power path is electrically coupled to the first winding. The second power path is electrically coupled to the second winding; and the power MUX is configured to select and transition between the first power path and the second power path to provide a single output power path to a load.

According to the teachings herein, the proposed arrangement may advantageously be implemented with a very wide range (e.g., three point three to forty-eight volt) flyback converter and/or with universal serial bus power delivery controllers. This may advantageously eliminate the need for multiple cascaded converter stages thereby reducing the number of stages to at most two including a power factor correction (PFC) stage.

FIG. 1A illustrates a switch mode power converter 100 for delivering power to a load 106 according to a first embodiment. The power converter 100 includes an energy transfer element 102, secondary side circuitry 104, a secondary controller 108, a primary controller 109, a clamp 110, and a primary switch 152. The secondary side circuit 104 includes a power multiplexer 117. The energy transfer element 102 includes a primary winding 112 and a plurality of stacked secondary windings 113; and the plurality of stacked secondary windings 113 include a first winding 116, a second winding 114, and a third winding 115 connected according to a "stacked" winding configuration.

Also as illustrated the primary winding 112 and the primary switch 152 can be connected between input terminals 101, 103 to receive rectified ac line voltage $V_{IN}$ relative to a primary ground GND. During a switching cycle (i.e., switching period), while the primary switch 152 is closed (i.e., conducting), the primary winding 112 may be energized by an increasing (i.e., ramping) primary current $I_{SW}$. According to the theories of magnetics and transformers, when the primary switch 152 is opened (i.e., transitions from conducting state to a blocking state), energy within the primary winding 112 may be transferred to one or more of the plurality of stacked secondary windings 113.

Primary controller 109 provides a primary control signal $V_{CS}$ to a control terminal (e.g., a gate) of the primary switch 152. In this manner the primary controller 109 controls the primary current $I_{SW}$ for energizing primary winding 112. The primary sense element 154 may provide a sense signal SENS to the primary controller to locally regulate a maximum value of the primary current $I_{SW}$; additionally, the clamp 110 may be connected in parallel with the primary winding 112 to limit (i.e., clamp) the switch voltage $V_{SW}$. As illustrated, the primary controller 109 may be configured to operate with signals (e.g., switch voltage $V_{SW}$ and primary control signal $V_{CS}$) which are referenced to primary ground GND.

Secondary controller 108 may communicate (i.e., receive and/or provide) signals 121 with secondary side circuitry 104. As one of ordinary skill in the art may appreciate, signals 121 may comprise a plurality of signals 121 including, but not limited to, feedback signals relating to regulation (e.g., voltage and/or power regulation) of the load 106. As illustrated, the secondary controller 108 may communicate with the primary controller 109 through a signal FL and provide select signals SEL1-SEL3 to the power MUX 117. In one embodiment, the secondary controller 108 may be configured to operate with signals which are referenced to the secondary ground RTN. Accordingly, the signal FL may be an optically coupled, magnetically coupled, and/or capacitively coupled signal FL to allow communication with the primary controller 109, which is referenced to primary ground GND.

The secondary side circuitry 104 includes a first power path 131, a second power path 133, and a third power path 132. According to the "dot" convention for transformer windings, the first power path 131 may be coupled between the dot terminal of first winding 116 and a first input INA of the power MUX 117. The second power path 133 may be coupled between the dot terminal of the second winding 114 and a second input INB of the power MUX 117; and the third power path 132 may be coupled between the dot terminal of the third winding 115 and the third input INX of the power MUX 117. Also, as illustrated the secondary side circuitry 104 includes an output power path 134 coupled between the load 106 and an output OUT of the power MUX 117.

As discussed above, energy (i.e., power) within the primary winding 112 may be transferred to the plurality of stacked secondary windings 113. According to the teachings herein, the power transferred to the secondary windings 113 may be selectively transferred to the load 106 by the power MUX 117. The secondary controller 108 may provide the select signals SEL1-SEL3 to the power MUX 117, and in response, the power MUX 117 may provide power from the first power path 131, second power path 133, and/or the third power path 132 to the output OUT of the power MUX 117.

For instance, the select signal SEL1 may be exerted so that the power MUX 117 selects (i.e., conducts and/or transitions to) the first power path 131; concurrently, the select signal SEL2 and select signal SEL3 may be exerted so that the power MUX 117 blocks the second power path 133 and the third power path 132. In this manner the power MUX 117 may selectively provide power (i.e., voltage $V_A$, current $I_A$) from the first input INA to the output power path 134. According to the teachings herein, the output power path 134 may be a single output power path 134.

Similarly, select signal SEL2 may be exerted so that the power MUX 117 selects (i.e., conducts and/or transitions to) the second power path 133; concurrently, the select signal SEL1 and select signal SEL3 may be exerted so that the power MUX 117 blocks the first power path 131 and the third power path 132. In this manner the power MUX 117 may selectively provide power (i.e., voltage $V_B$, current $I_B$) from the second input INB to the output power path 134.

Additionally, select signal SEL3 may be exerted so that the power MUX 117 selects (i.e., conducts and/or transitions to) the third power path 132; concurrently, the select signal SEL1 and select signal SEL2 may be exerted so that the power MUX 117 blocks the first power path 131 and the second power path 133. In this manner the power MUX 117 may selectively provide power (i.e., voltage $V_X$, current $I_X$) from the third input INX to the output power path 134.

According to the teachings herein, the load demand (i.e., the output power demand) may be variable. For instance, the load may demand (i.e., require) up to a first power level (e.g., up to one hundred watts) with regulated output voltage $V_O$, and/or regulated output current $I_O$. The switch mode power converter 100 may convert input power derived from a rectified ac line voltage $V_{IN}$ to provide output power (i.e., output voltage $V_O$, and output current $I_O$) demanded by the load 106.

Although the switch mode power converter 100 illustrates a switch-mode configuration (e.g., a flyback configuration) for providing output power (i.e., output voltage $V_O$, and output current $I_O$) to the load 106, other configurations are possible. For instance, the teachings herein may also be applicable to forward converters and/or other converter topologies using transformers having multiple parallel secondary windings. Moreover, as one of ordinary skill in the art may appreciate, secondary side circuitry 104 may have greater or fewer than three power paths 131-133.

Figure 1B:
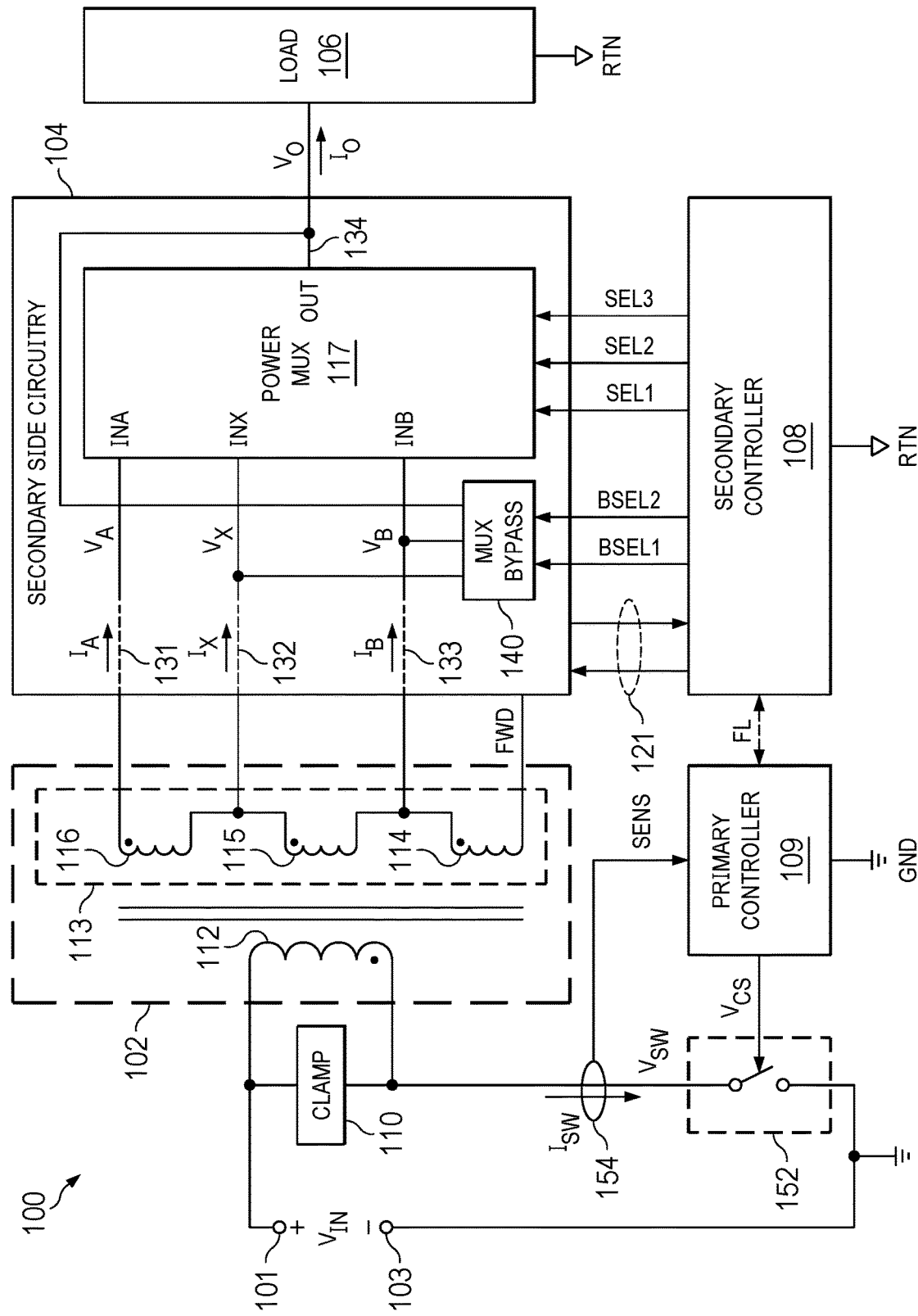
FIG. 1B illustrates a switch mode power converter for delivering power to a load according to a second embodiment.

FIG. 1B illustrates a switch mode power converter 100 for delivering power to a load 106 according to a second embodiment. The switch mode power converter 100 of FIG. 1B is like that of FIG. 1A, except the secondary side circuitry 104 of FIG. 1B includes a multiplexer (MUX) bypass circuit 140. The second input INB, the third input INX, and the output OUT are electrically connected to the MUX bypass circuit 140; and the secondary controller 108 may provide bypass select signals BSEL1-BSEL2 to the MUX bypass circuit 140.

According to the teachings herein, the MUX bypass circuit 140 may bypass the power MUX 117 to enhance performance. For instance, the MUX bypass circuit 140 may provide an alternative (i.e., bypass) connection between the second input INB and the output OUT and/or between the third input INX and the output OUT. As further discussed below, this may advantageously improve a transient response during transitions of the power multiplexer 117.

Figure 1C:
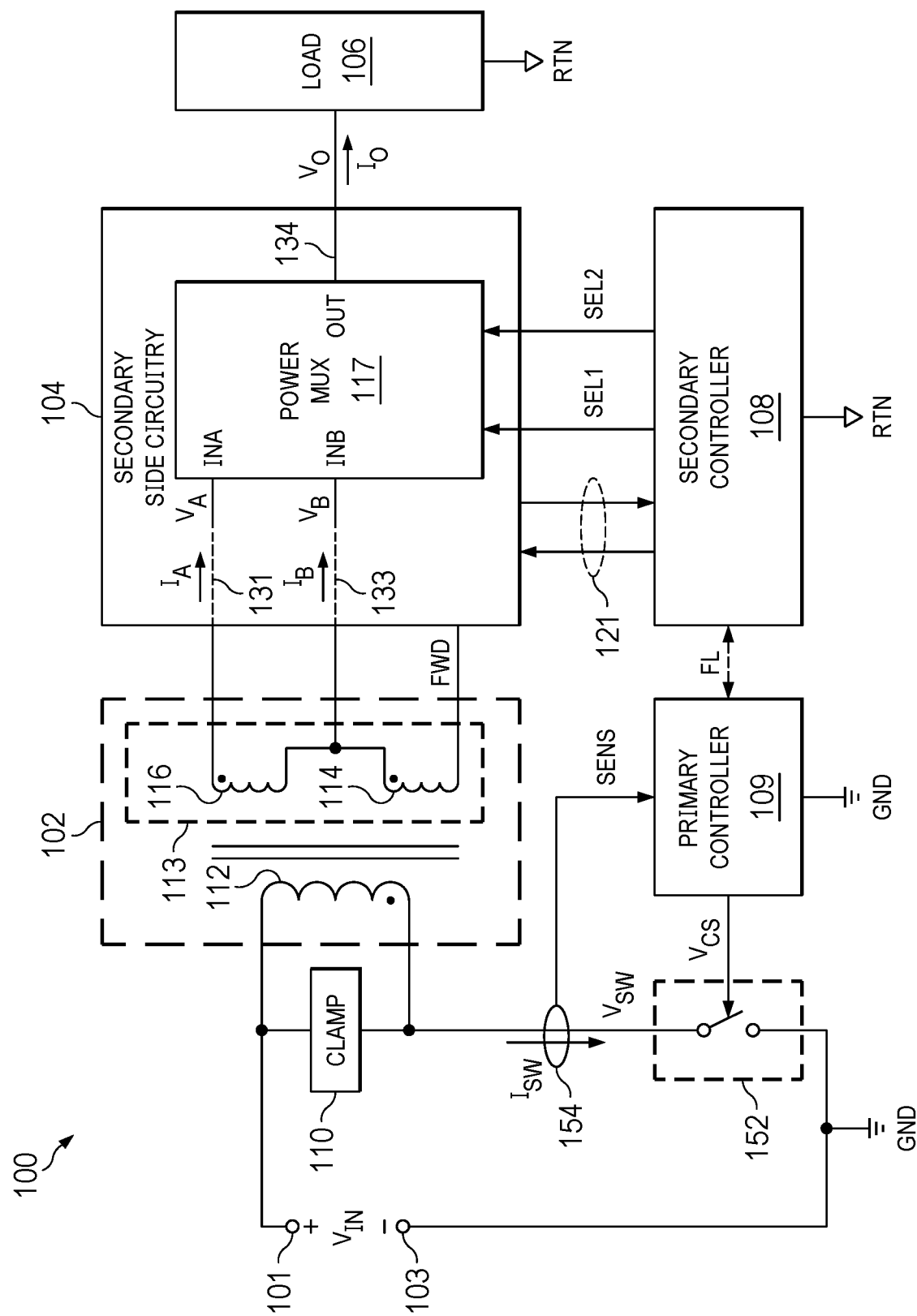
FIG. 1C illustrates a switch mode power converter for delivering power to a load according to a third embodiment.

FIG. 1C illustrates a switch mode power converter 100 for delivering power to a load 106 according to a third embodiment. The switch mode power converter 100 of FIG. 1C is like that of FIG. 1A, except the secondary side circuitry 104 of FIG. 1C has two power paths (i.e., the first power path 131 and the second power path 133) instead of three. Accordingly, the power MUX 117 of FIG. 1B has two inputs (i.e., the first input INA and the second input INB) instead of three; and the secondary controller 108 may provide two select signals SEL1, SEL2 instead of three.

Figure 1D:
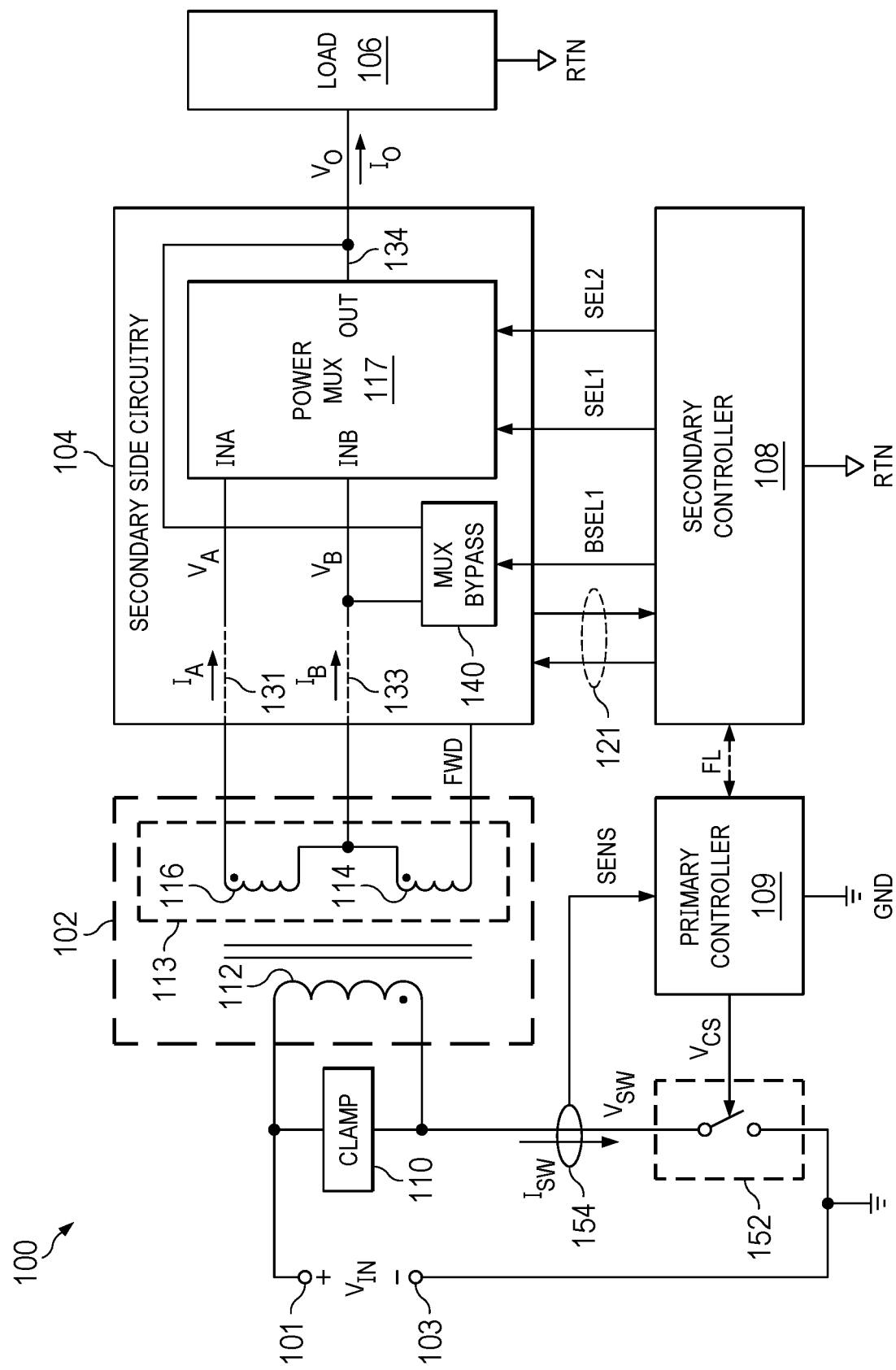
FIG. 1D illustrates a switch mode power converter for delivering power to a load according to a fourth embodiment.

FIG. 1D illustrates a switch mode power converter 100 for delivering power to a load 106 according to a fourth embodiment. The switch mode power converter 100 of FIG. 1D is like that of FIG. 1C, except the secondary side circuitry 104 of FIG. 1D includes a multiplexer (MUX) bypass circuit 140 electrically coupled to the power MUX 117. As illustrated the MUX bypass circuit 140 is electrically connected at the second input INB and the output OUT; and the bypass circuit 140 may receive the bypass select signal BSEL1 from secondary controller 108.

As discussed above and according to the teachings herein, the MUX bypass circuit 140 may bypass the power MUX 117 to enhance performance. For instance, the MUX bypass circuit 140 may provide an alternative (i.e., bypass) connection between the second input INB and the output OUT to improve a transient response during transitions of the power multiplexer 117.

Figure 1E:
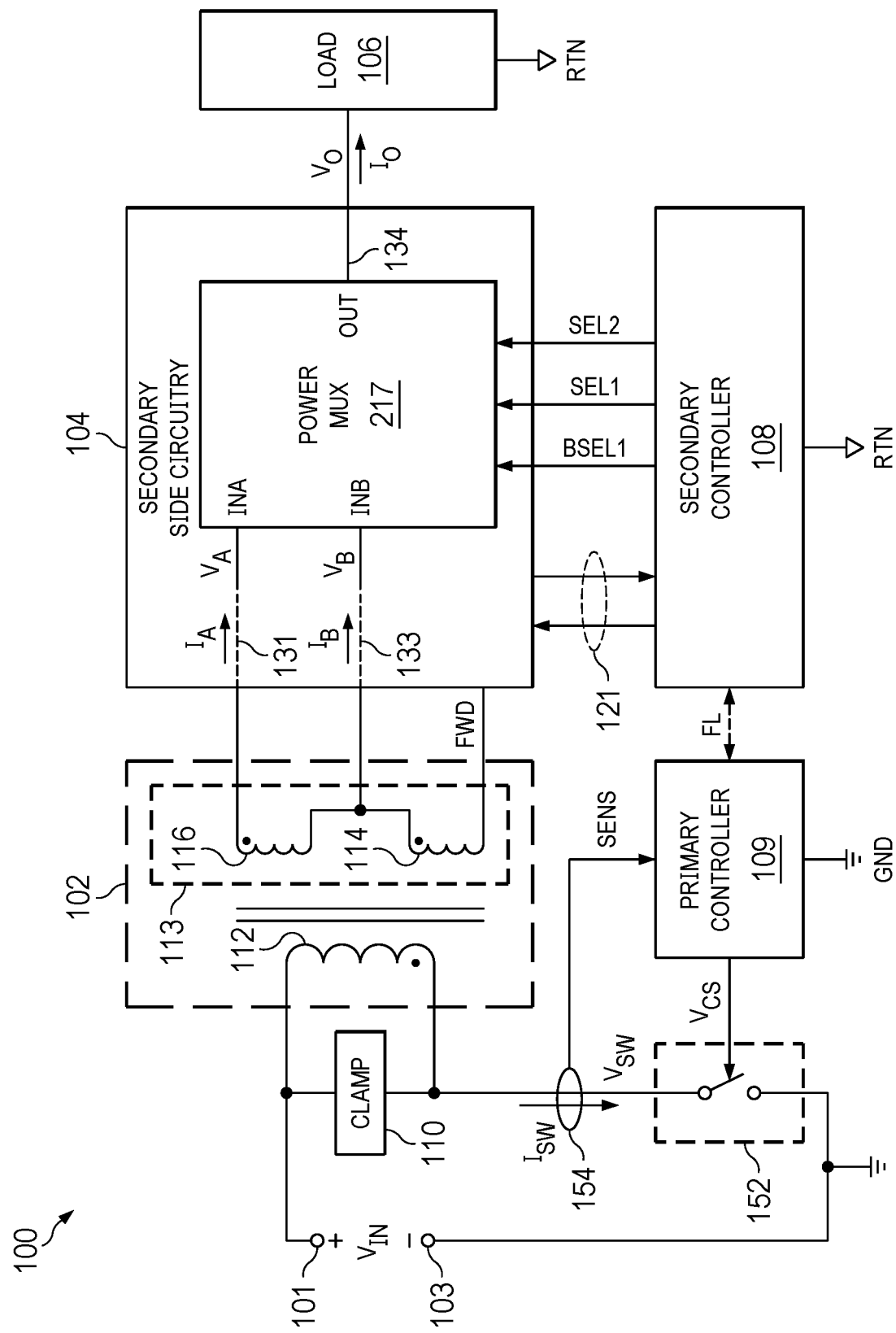
FIG. 1E illustrates a switch mode power converter for delivering power to a load according to a fifth embodiment.

Although FIG. 1B and FIG. 1D illustrate the MUX bypass circuit 140 as being external to the power MUX 117, other configurations are possible. For instance, FIG. 1E illustrates a switch mode power converter 100 for delivering power to a load 106 according to a fifth embodiment. The switch mode power converter 100 of FIG. 1E is like that of FIG. 1D, except the secondary side circuitry 104 of FIG. 1E includes a power MUX 217. As discussed below with regards to FIG. 2F, power MUX 217 may receive the bypass select signal BSEL1 and provide additional functionality including features of bypass circuit 140. Thus, as described herein, the configuration of FIG. 1E may advantageously reduce the number of components relative that of FIG. 1D.

Figure 1F:
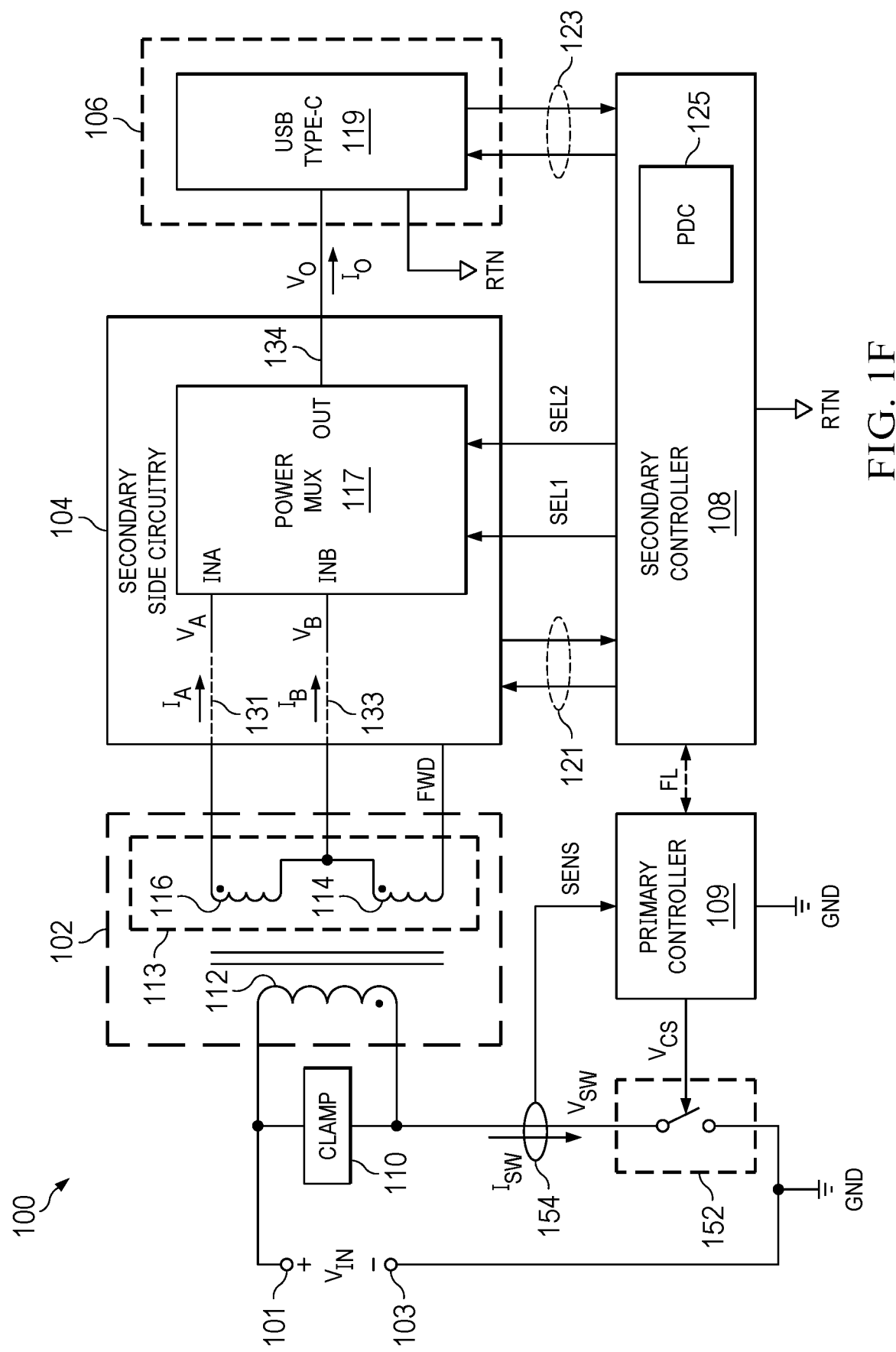
FIG. 1F illustrates a switch mode power converter for delivering power to a load according to a sixth embodiment.

FIG. 1F illustrates a switch mode power converter 100 for delivering power to a load 106 according to a sixth embodiment. The switch mode power converter 100 of FIG. 1F is like that of FIG. 1C, except the load 106 may comprise a USB type-C (USB-C) load 119; and the secondary controller 108 may comprise a power delivery controller (PDC) 125. The USB-C load 119 may communicate with the secondary controller 108 and the PDC 125 via USB-C control signals 123. For instance, USB-C control signals 123 may be provided via a USB-C cable connected to the USB-C load 119 to communicate with and provide feedback to the PDC 125. In turn, the secondary controller 108 may provide signals 121 and at least one select signal (e.g., select signal SEL1 and/or select signal SEL2) to regulate and to provide output power (i.e., output voltage $V_O$, and output current $I_O$) to USB-C load 119.

According to the teachings herein, the USB-C load 119 may communicate power requirements with the secondary controller 108 and/or the PDC 125. For instance, the USB-C load 119 may communicate via USB-C control signals 123 to indicate SPR and/or EPR load demand. When the USB-C load 119 requests SPR operation, the select signals SEL1-SEL2 may be exerted so that the power MUX 117 selects power at the second input INB from the second power path 133. Alternatively, and additionally, when the USB-C load 119 requests EPR operation, the select signals SEL1-SEL2 may be exerted so that the power MUX 117 selects power at the first input INA from the first power path 131.

Figure 1G:
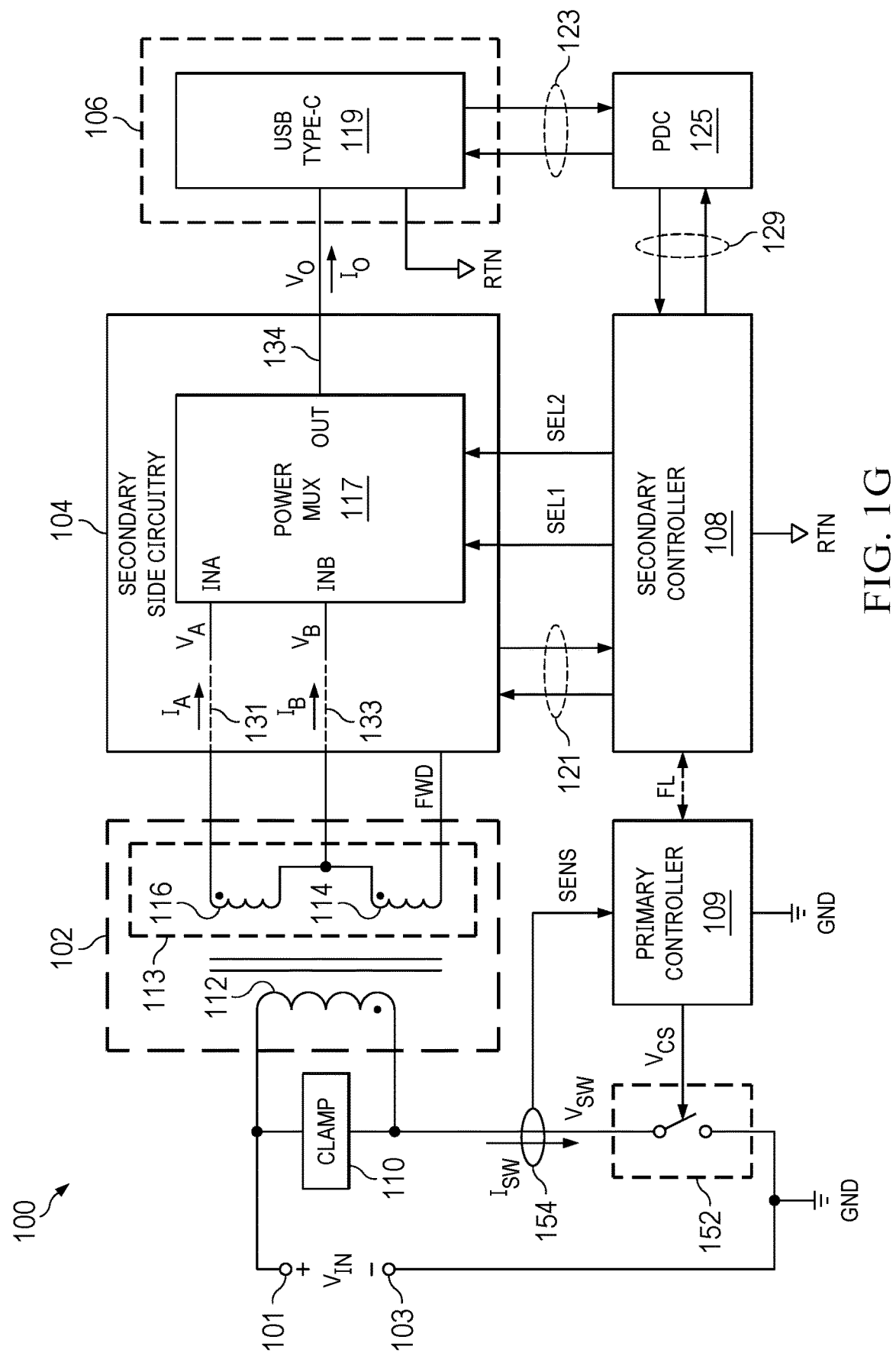
FIG. 1G illustrates a switch mode power converter for delivering power to a load according to a seventh embodiment.

FIG. 1G illustrates a switch mode power converter 100 for delivering power to a load 119 according to a seventh embodiment. The switch mode power converter 100 of FIG. 1G is like that of FIG. 1F, except the PDC 125 is external to the secondary controller 108. The PDC 125 may communicate with the USB-C load 119 using USB-C control signals 123 and with the secondary controller 108 using PDC control signals 129 external to the secondary controller 108.

Figure 1H:
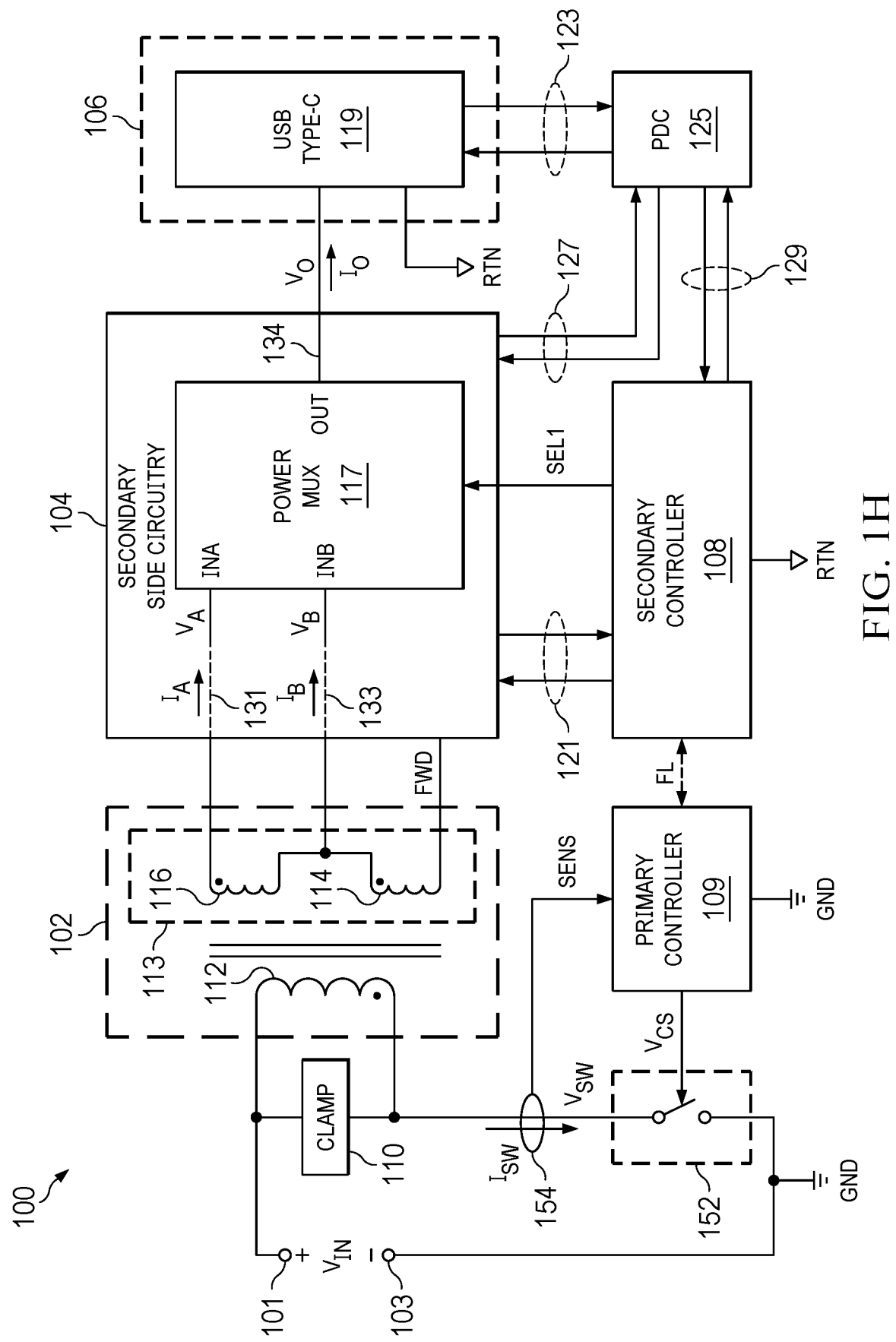
FIG. 1H illustrates a switch mode power converter for delivering power to a load according to an eighth embodiment.

FIG. 1H illustrates a switch mode power converter 100 for delivering power to a load 119 according to an eighth embodiment. The switch mode power converter 100 of FIG. 1H is like that of FIG. 1G, except the PDC 125 may also communicate with the secondary side circuitry 104 via PDC control signals 127. For instance, the PDC control signals 127 may comprise at least one select signal; and the PDC 125 may provide a select signal (e.g., select signal SEL2) to the power MUX 117.

Figure 2A:
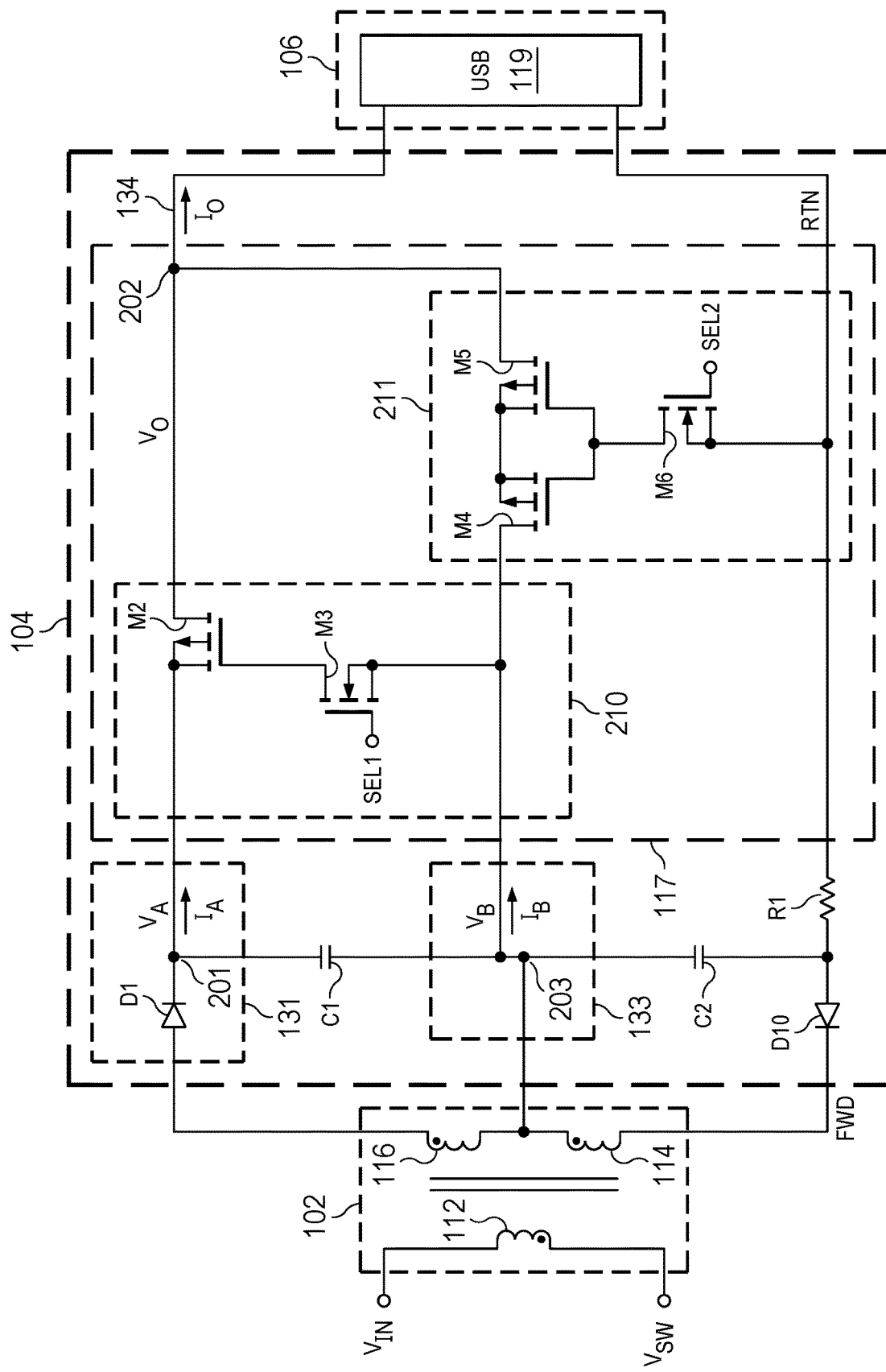
FIG. 2A illustrates secondary side circuitry for delivering power to a load from an energy transfer element according to a first embodiment.

FIG. 2A illustrates secondary side circuitry 104 for delivering power to a load 106 from an energy transfer element 102 according to a first embodiment. The first power path 131 comprises a diode D1 and circuit path node 201. As illustrated the diode D1 comprises a cathode coupled to the circuit path node 201 and an anode coupled to the dot terminal of the first winding 116. The second power path 133 comprises a circuit path node 203. The secondary side circuitry 104 includes diode D10 and resistor R1. A cathode of diode D10 is connected to the second winding 114 where it may provide a forward pin signal FWD; and an anode of diode D10 is coupled to a first terminal of resistor R1. The second terminal of resistor R1 is coupled to the secondary ground RTN and to the USB-C load 119. A capacitor C1 is coupled between circuit path node 201 and circuit path node 203; and a capacitor C2 is coupled between circuit path node 203 and the anode of diode D10.

The power MUX 104 comprises a MUX switch 210 and a MUX switch 211. The MUX switch 210 includes a p-channel field effect transistor (PFET) M2 and an n-channel field effect transistor (NFET) M3. The MUX switch 211 includes a PFET M4, a PFET M5, and an NFET M6. The body and source of PFET M2 are coupled together at the circuit path node 201 corresponding with the first input INA of the power MUX 117. The drain of PFET M2 is coupled to a circuit path node 202 corresponding with the output OUT of the power MUX 117. A drain of the NFET M3 is coupled to the gate of PFET M2. The body and source of the NFET M3 are coupled together to the circuit path node 203; and the gate of the NFET M3 may receive the select signal SELL. Accordingly, when the select signal SEL1 causes the gate-to-source voltage of the NFET M3 to be above a threshold (i.e., to be exerted high), the gate of PFET M2 may be driven so that the PFET M2 conducts, thereby connecting the first power path 131 to the output power path 134. Conversely, when the select signal SEL1 is exerted low, the PFET M2 blocks, thereby blocking (i.e., disconnecting) the first power path 131 from the output power path 134.

Also as illustrated, the PFET M4 and PFET M5 are coupled in a back-to-back configuration switch configuration whereby the body and source of PFET M4 are coupled to the body and source of PFET M5. The drain of PFET M4 is coupled to the circuit path node 203 corresponding with the second input INB of the power MUX 117. The drain of PFET M5 is coupled to circuit path node 202 corresponding with the output OUT of the power MUX 117. A drain of the NFET M6 is coupled to the gate of the PFET M4 and the gate of the PFET M5. The body and source of the NFET M6 are coupled together to the secondary ground RTN; and the gate of the NFET M6 may receive the select signal SEL2. Accordingly, when the select signal SEL2 causes the gate-to-source voltage of the NFET M6 to be above a threshold (i.e., to be exerted high), the PFET M4 and PFET M5 may conduct, thereby connecting the second power path 133 to the output power path 134. Conversely, when the select signal SEL2 is exerted low, the PFET M4 and PFET M5 block, thereby blocking (i.e., disconnecting) the second power path 133 from the output power path 134.

Figure 2B:
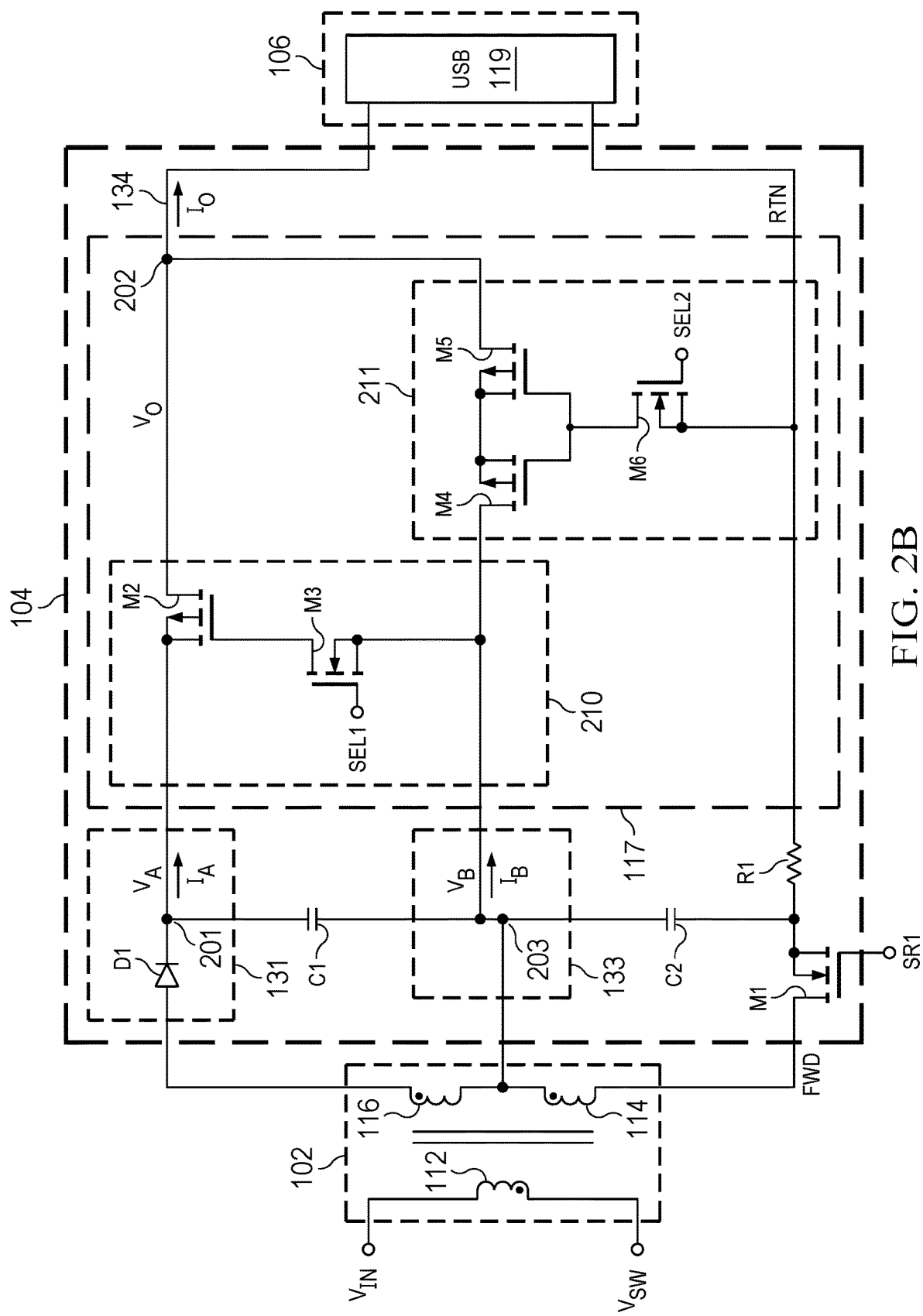
FIG. 2B illustrates secondary side circuitry for delivering power to a load from an energy transfer element according to a second embodiment.

FIG. 2B illustrates secondary side circuitry 104 for delivering power to a load 106 from an energy transfer element 102 according to a second embodiment. The secondary side circuitry 104 of FIG. 2B is like that of FIG. 2A, except the diode 10 has been replaced with an NFET M1. As illustrated the drain of NFET M1 may be connected to the second winding 114, and the body and source of NFET M1 may be connected at the first terminal of resistor R1. The gate of NFET M1 receives a gate signal SR1. The gate signal SR1 may be exerted so that the NFET M1 operates as a synchronous rectifier (SR).

Figure 2C:
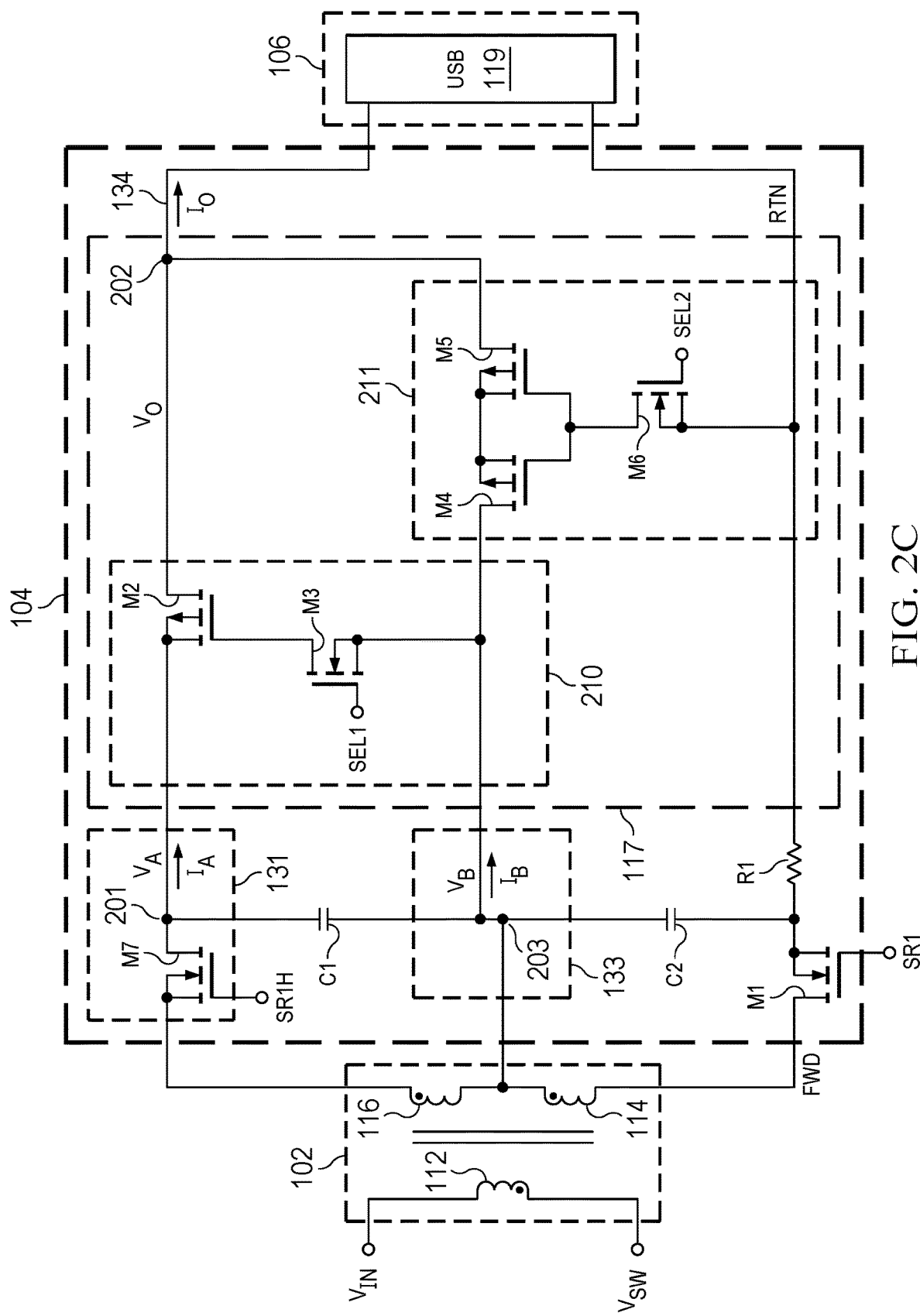
FIG. 2C illustrates secondary side circuitry for delivering power to a load from an energy transfer element according to a third embodiment.

FIG. 2C illustrates secondary side circuitry 100 for delivering power to a load 106 from an energy transfer element 102 according to a third embodiment. The secondary side circuitry 104 of FIG. 2C is like that of FIG. 2B, except the diode D1 has been replaced with an NFET M7. As illustrated the drain of NFET M7 may be connected to the circuit path node 201, and the body and source of NFET M7 may be connected at the dot terminal of first winding 116. The gate of NFET M7 receives a gate signal SR1H. The gate signal SR1H may be exerted so that the NFET M7 operates as a synchronous rectifier (SR). In one embodiment the gate signal SR1H may be level shifted with respect to gate signal SR1.

Figure 2D:
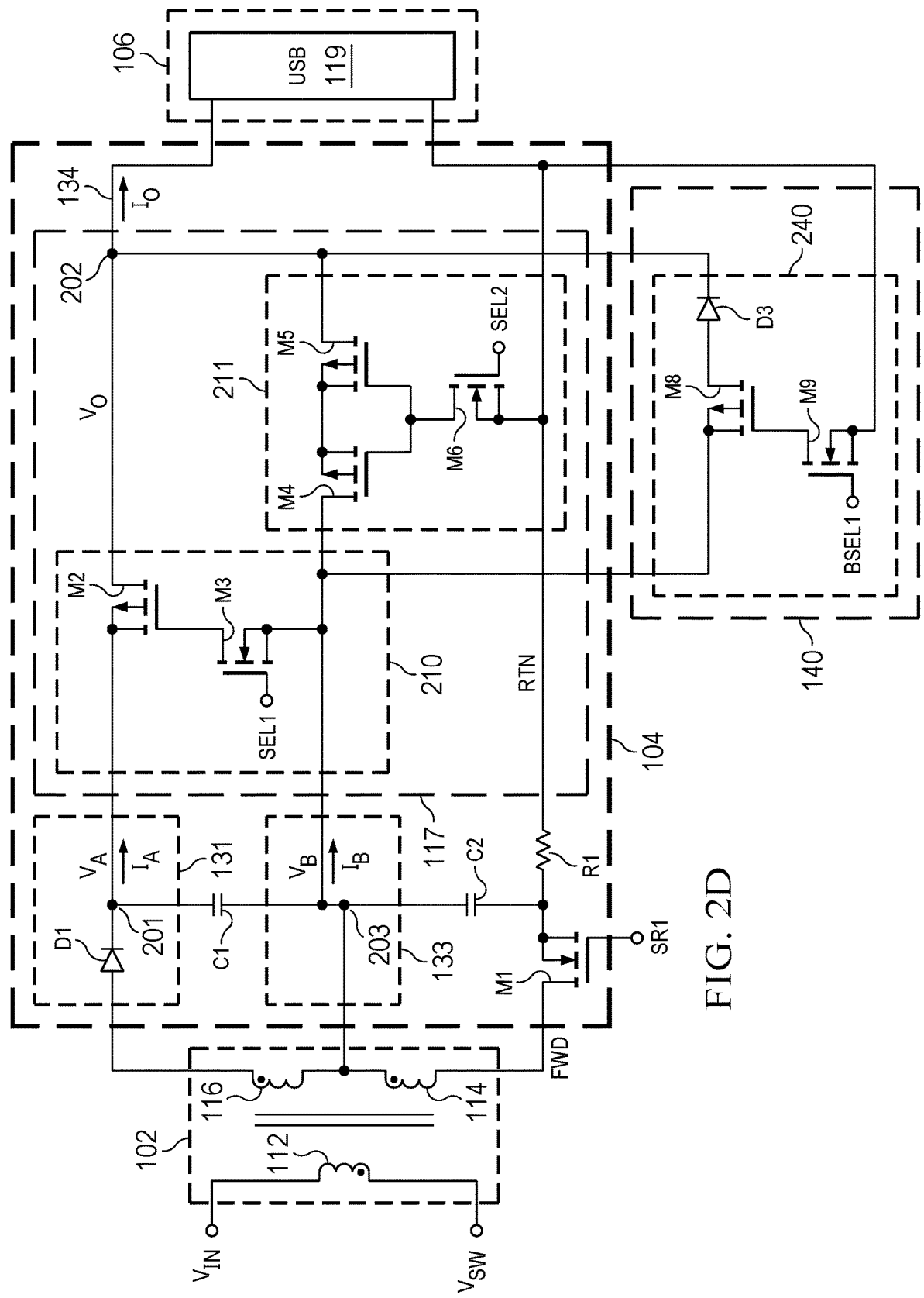
FIG. 2D illustrates secondary side circuitry for delivering power to a load from an energy transfer element according to a fourth embodiment.

FIG. 2D illustrates secondary side circuitry 100 for delivering power to a load 106 from an energy transfer element 102 according to a fourth embodiment. The secondary side circuitry 104 of FIG. 2D is like that of FIG. 2B, except it includes a MUX bypass circuit 140; and the MUX bypass circuit 140 comprises a transfer switch 240. The transfer switch 240 includes a p-channel field effect transistor (PFET) M8, a diode D3, and an n-channel field effect transistor (NFET) M9. The body and source of PFET M8 are coupled together at the circuit path node 203 corresponding with the second input INB of the power MUX 117. The anode of diode D3 is connected to the drain of PFET M8; and the cathode of diode D3 is coupled to a circuit path node 202 corresponding with the output OUT of the power MUX 117.

A drain of the NFET M9 is coupled to the gate of PFET M8. The body and source of the NFET M9 are coupled together to the secondary ground RTN; and the gate of the NFET M9 may receive the bypass select signal BSEL1. Accordingly, when the bypass select signal BSEL1 causes the gate-to-source voltage of the NFET M9 to be above a threshold (i.e., to be exerted high), the gate of PFET M8 may be driven so that the PFET M8 conducts, thereby connecting (i.e., bypassing) the second power path 133 to the output power path 134. Diode D3 may assure direct current (DC) current flow to the load 106. Conversely, when the bypass select signal BSEL1 is exerted low, the PFET M2 blocks, thereby blocking (i.e., disconnecting) the first power path 131 from the output power path 134.

According to the teachings herein, the bypass select signal BSEL1 may be provided during a transition of the power MUX 117 (i.e., during a transient condition from steady state). The transfer switch 240 may be configured to enhance performance; for instance, the transfer switch 240 may improve the transient behavior of the output voltage $V_O$ when the load 106 comprises parasitic capacitance. In one embodiment the bypass select signal BSEL1 may be provided so that the transfer switch 240 remains on for a fixed duration of time (i.e., for a transition time TRS). In another embodiment the bypass select signal BSEL1 may be determined by a closed loop feedback system which monitors (e.g., samples) transient conditions (e.g., the output voltage $V_O$).

Figure 2E:
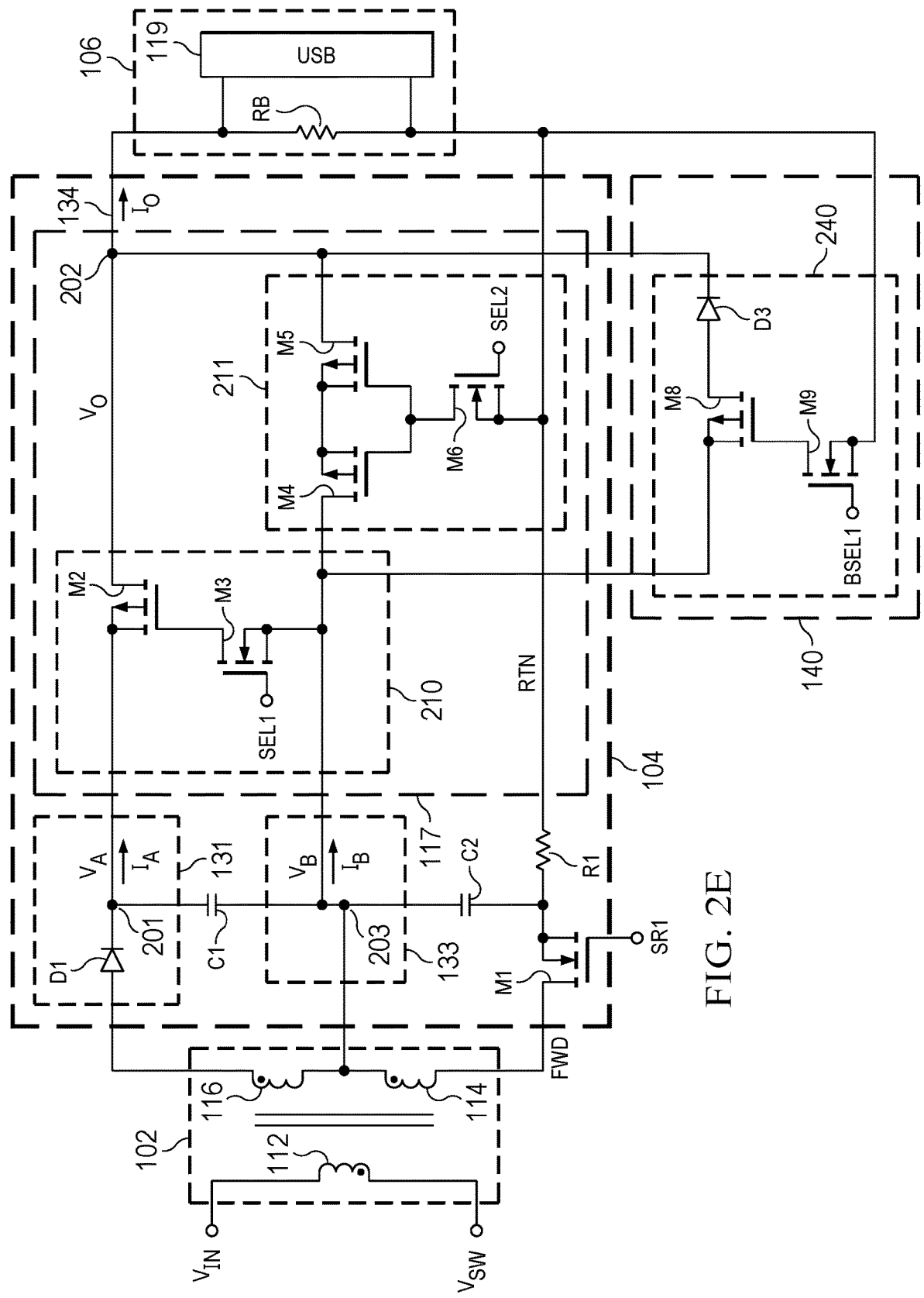
FIG. 2E illustrates secondary side circuitry for delivering power to a load from an energy transfer element according to a fifth embodiment.

FIG. 2E illustrates secondary side circuitry 104 for delivering power to a load 106 from an energy transfer element 102 according to a fifth embodiment. The secondary side circuitry 104 of FIG. 2E is like that of FIG. 2D, except the load 106 includes a bleeder resistor RB. The bleeder resistor RB may be electrically coupled to the USB-C load 119 to draw (i.e., bleed) current during transitions of the power MUX 117. According to an embodiment, the bypass select signal BSEL1 may be exerted so that the transfer switch 240 conducts during a transition time TRS relating to and/or proportional to a resistance of the bleeder resistor RB.

Although the MUX bypass circuit 140 is illustrated as comprising a transfer switch 240 connected between circuit path node 203 and circuit path node 202 corresponding with output OUT, other configurations are possible. For instance, the MUX bypass circuit 140 of FIG. 1B may comprise more than one transfer switch 240.

Alternatively, and additionally, as discussed above with regards to FIG. 1E, the secondary side circuit 104 may provide additional functionality including features of bypass circuit 140. For instance, FIG. 2F illustrates secondary side circuitry 104 for delivering power to a load 106 from an energy transfer element 102 according to a sixth embodiment.

Figure 2F:
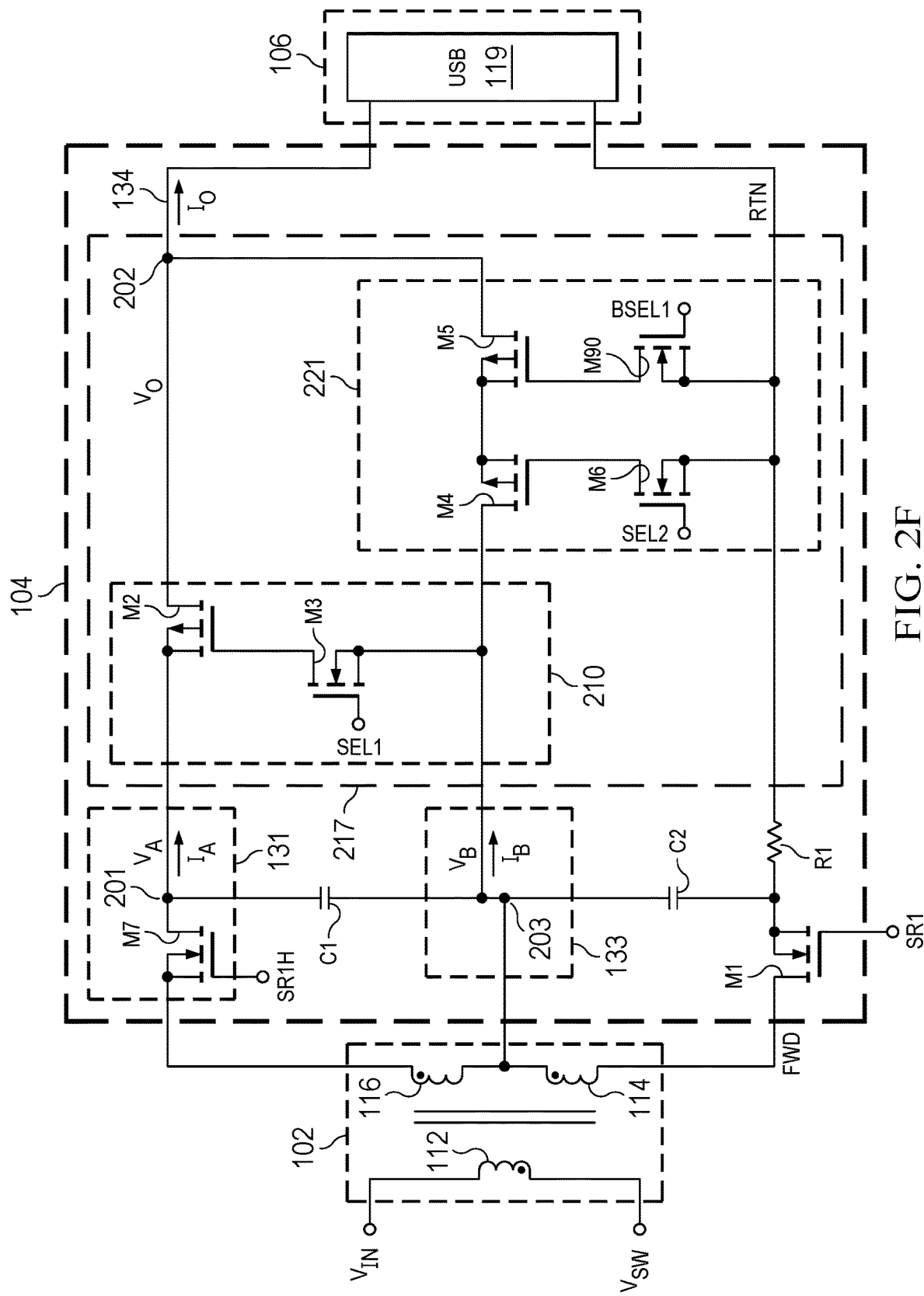
FIG. 2F illustrates secondary side circuitry for delivering power to a load from an energy transfer element according to a sixth embodiment.

FIG. 2F illustrates a secondary side circuit 104 of FIG. 2F like that of FIG. 2D, except it includes power MUX 217 and may exclude a MUX bypass circuit 140. Power MUX 217 is like that of power MUX 117; however, power MUX 217 includes MUX switch 221 instead of MUX switch 211.

MUX switch 221 is like that of MUX switch 211, except MUX switch 221 includes an NFET M90. As illustrated, the body and source of the NFET M90 are coupled together to the secondary ground RTN; and the gate of the NFET M90 may receive the bypass select signal BSEL1. Also, as illustrated, the gate of PFET M5 may be connected to the drain of NFET M90 instead of the drain of NFET M6.

Like the configuration in MUX switch 211, MUX switch 221 includes PFET M4 and PFET M5. However, the gate of PFET M4 is electrically coupled to the drain of NFET M6, while the gate of PFET M5 may be electrically coupled to the drain of NFET M90; and as illustrated, the gate of NFET M6 may receive the select signal SEL2.

Accordingly, MUX switch 221 may connect and disconnect the second power path 133 from the output power path 134 based, at least in part, upon the select signal SEL2 and the bypass select signal BSEL1. For instance, when bypass select signal BSEL1 and select signal SEL2 are both exerted high so that the gate-to-source voltages of NFET M6 and NFET M90 are above a threshold, then PFET M4 and PFET M5 may conduct, thereby connecting the second power path 133 to the output power path 134. Conversely, when both the bypass select signal BSEL1 and the select signal SEL2 are exerted low, then PFET M4 and PFET M5 may block, thereby disconnecting the second power path 133 from the output power path 134.

Additionally, when bypass select signal BSEL1 is exerted high while select signal SEL2 is exerted low, then PFET M5 may operate in the on-state while the body diode of PFET M4 is forward biased. Accordingly, like the transfer switch 240, the MUX switch 221 may provide an alternative (i.e., bypass) connection between the second input INB and the output OUT via the body diode of PFET M4. Thus, the bypass select signal BSEL1 may be provided (i.e., exerted high) during a transition of the power MUX 217 (i.e., during a transient condition from steady state) in the same manner as the bypass select signal BSEL1 is provided during a transition of the power MUX 117.

Alternatively, when bypass select signal BSEL1 is exerted low while the select signal SEL2 is exerted high, then PFET M4 would undesirably operate in the on-state if the body diode of PFET M5 becomes forward biased. Accordingly, the state (i.e., condition) whereby the bypass select signal BSEL1 is exerted low concurrently with the select signal SEL2 exerted high is an unused, logically forbidden condition.

As illustrated, the secondary side circuitry 104 of FIG. 2F may advantageously use fewer components than that of FIG. 2D. For instance, the MUX bypass circuit 140 of FIG. 2D introduces three additional components (i.e., PFET M8, diode D3, and NFET M9); in contrast the MUX switch 221 of FIG. 2F introduces one additional component (i.e., NFET M90).

Although the various schematics shown in the figures depict example arrangements of elements and components, elements may be implemented in a variety of different ways. For instance, FIG. 2G, FIG. 2H, and FIG. 2I illustrate secondary side circuitry 104 for delivering power to a load 106 from an energy transfer element 102 according to additional embodiments.

Figure 2G:
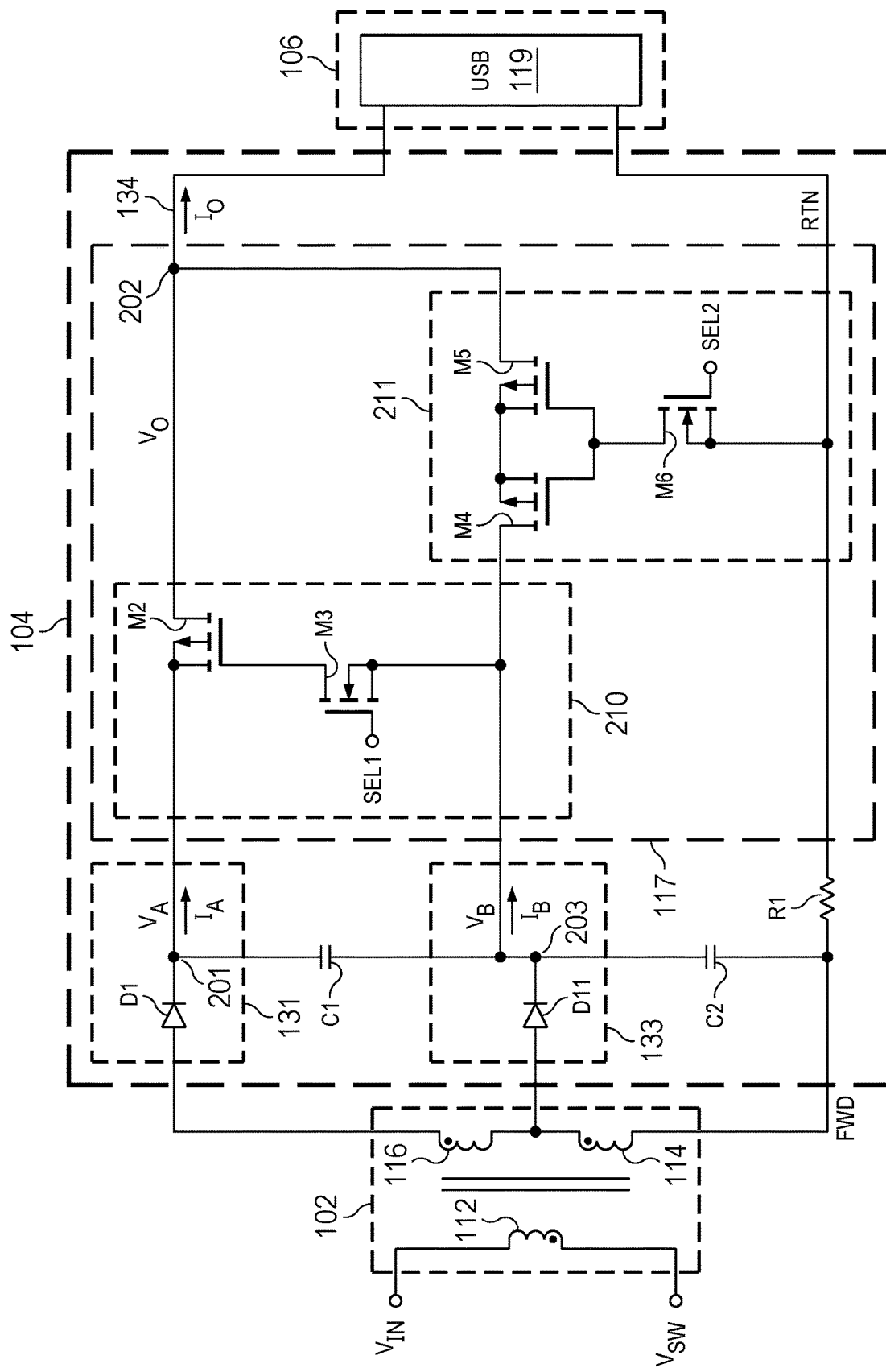
FIG. 2G illustrates secondary side circuitry for delivering power to a load from an energy transfer element according to another embodiment.

The secondary side circuitry 104 of FIG. 2G is like that of FIG. 2A, except the second power path 133 includes a diode D11. As illustrated the diode D11 comprises a cathode coupled to the circuit path node 203 and an anode coupled to the dot terminal of the second winding 114. As one of ordinary skill in the art may appreciate, by Including diode D11, the secondary side circuitry 104 of FIG. 2G may exclude diode D10.

Figure 2H:
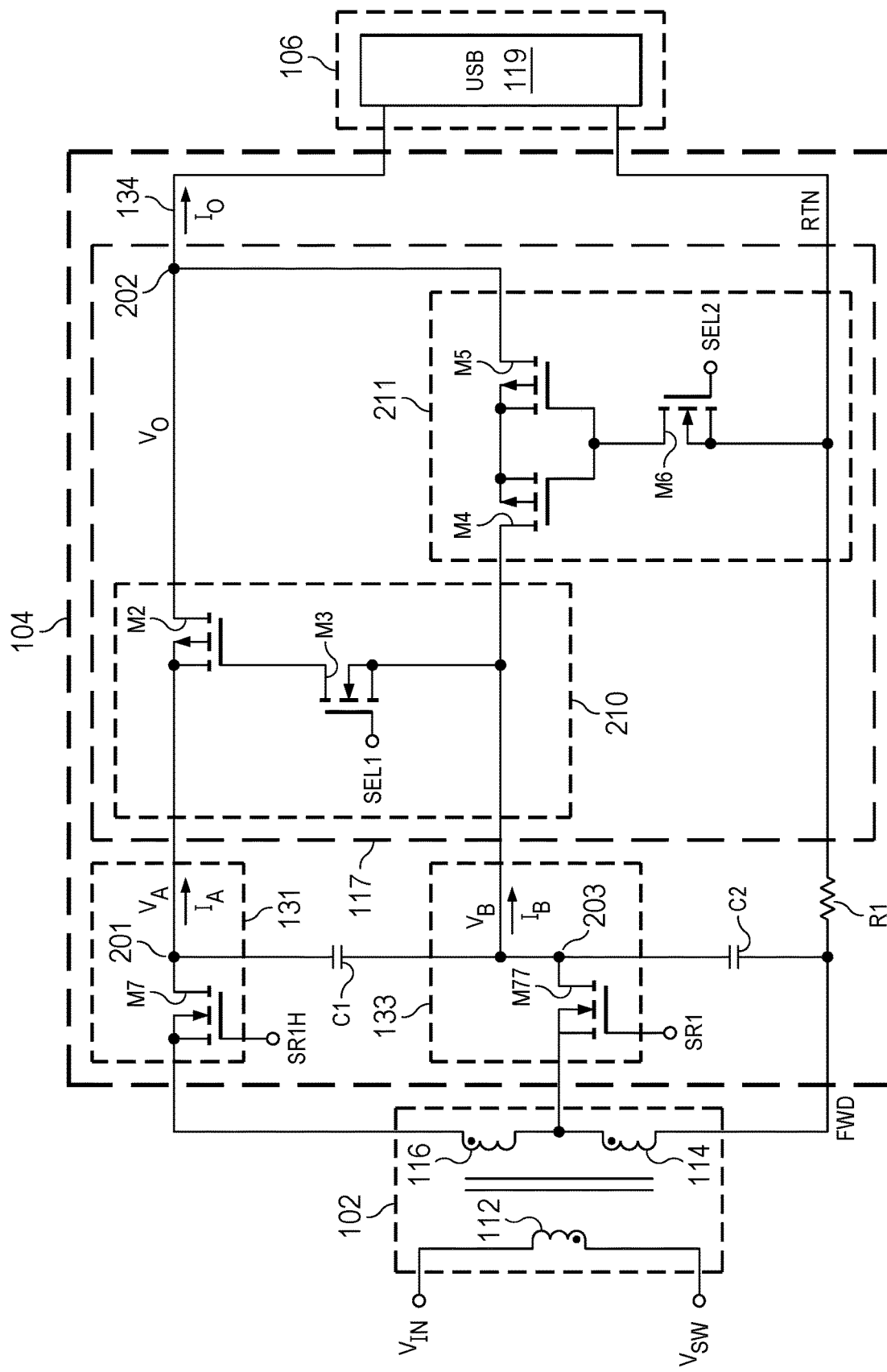
FIG. 2H illustrates secondary side circuitry for delivering power to a load from an energy transfer element according to another embodiment.

The secondary side circuitry 104 of FIG. 2H is like that of FIG. 2G, except the except the diode D11 has been replaced with an NFET M77. As illustrated the drain of NFET M77 may be connected to the circuit path node 203, and the body and source of NFET M77 may be connected at the dot terminal of second winding 114. The gate of NFET M77 receives a gate signal SR1. The gate signal SR1 may be exerted so that the NFET M77 operates as a synchronous rectifier (SR).

Figure 2I:
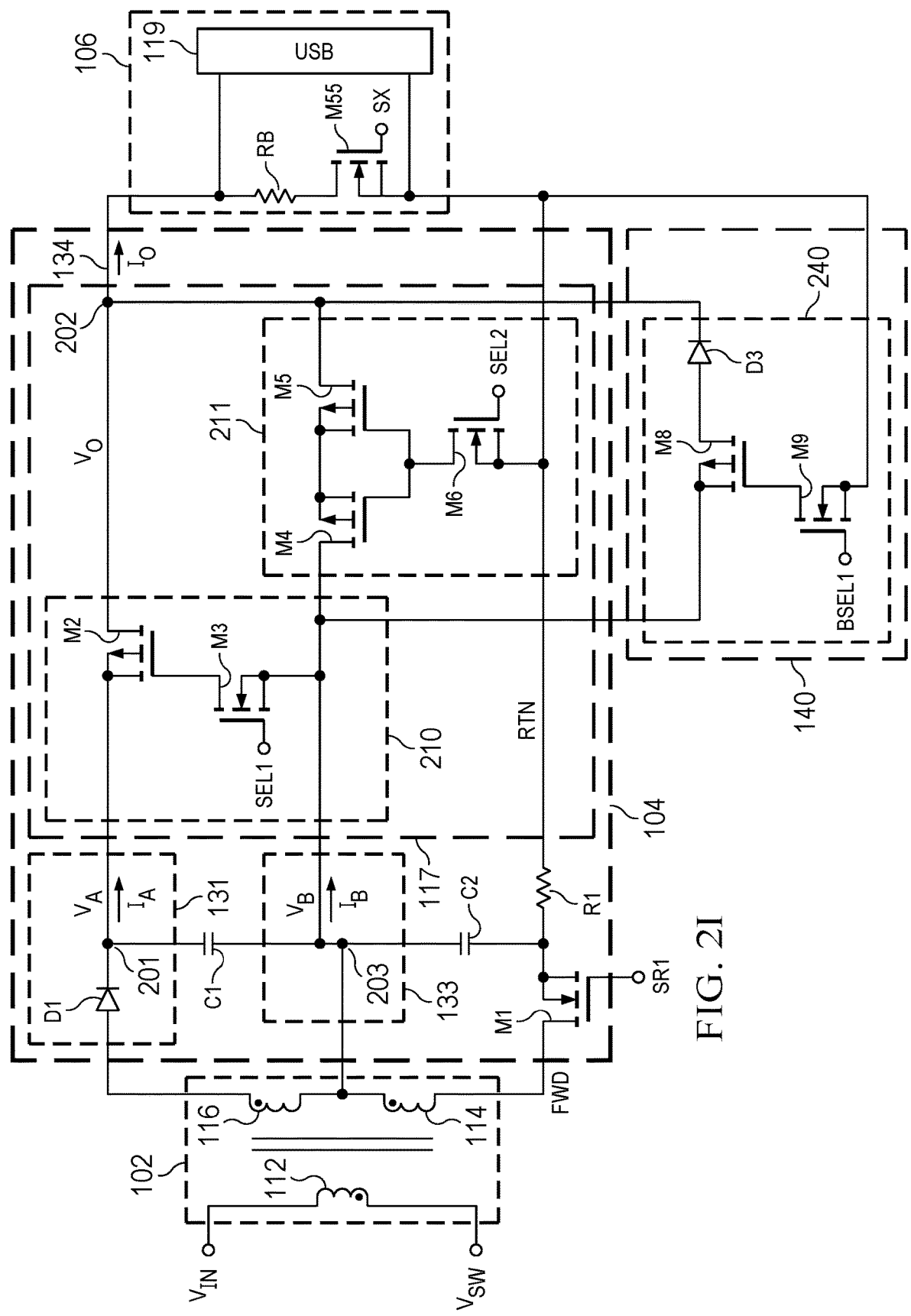
FIG. 2I illustrates secondary side circuitry for delivering power to a load from an energy transfer element according to another embodiment.

The secondary side circuit 104 and load 106 of FIG. 2I are like that of FIG. 2E, except the load includes an additional NFET M55 electrically coupled between the bleeder resistor RB and secondary ground RTN. As illustrated, the drain of NFET M55 is electrically coupled to the bleeder resistor RB; and the body and source of NFET M55 are electrically coupled to the secondary ground RTN. NFET M55 may operate as a switch to control current flow through the bleeder resistor RB when needed. In this manner power loss may advantageously be reduced.

Figure 3:
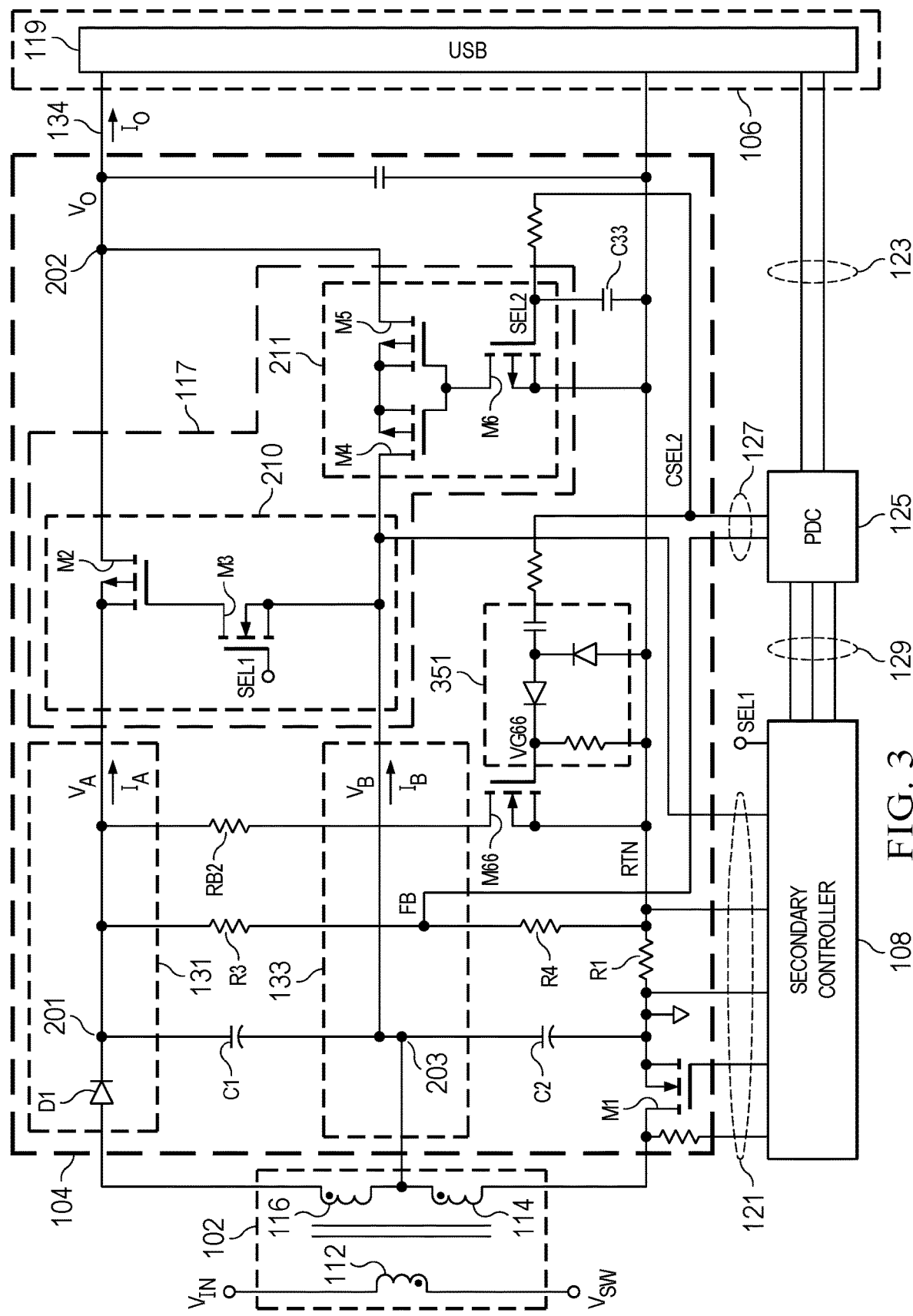
FIG. 3 illustrates secondary side circuitry under control of a secondary controller and power delivery controller according to an embodiment.

FIG. 3 illustrates secondary side circuitry 104 under control of a secondary controller 108 and power delivery controller 125 according to an embodiment. The secondary side circuitry 104 of FIG. 3 may be like that of FIG. 2B except it includes additional circuit components for enhanced performance. Also, the embodiment of FIG. 3 illustrates additional circuit connections between the PDC 125, secondary controller 108, USB-C load 119 and the secondary side circuitry 104. For instance, secondary side circuitry 104 further comprises a resistor R3 and a resistor R4 electrically coupled between the circuit path node 201 and the secondary ground RTN. Resistor R3 and resistor R4 may provide a feedback signal FB to the PDC 125 for regulating a voltage (i.e., voltage $V_A$) of the first power path 131.

Additionally, the secondary side circuitry 104 further comprises a bleeder resistor RB2, NFET M66, a pulse interface circuit 351, and a gate capacitor C33. As illustrated, the bleeder resistor RB2 and NFET M66 may be electrically coupled in series between circuit path node 201 and secondary ground RTN; and like bleeder resistor RB, bleeder resistor RB2 may draw (i.e., bleed) current during transitions of the power MUX 117. Gate capacitor C33 may be electrically coupled between the gate of NFET M6 and secondary ground RTN.

According to the embodiment of FIG. 3, NFET M66 may be switched on and off to control the duration and timing (e.g., pulse timing) of bleed current through resistor RB2.

Also, according to the embodiment of FIG. 3, the pulse interface circuit 351 may be configured to receive a dual-mode drive signal CSEL2 from PDC 125 and to provide a gate voltage VG66 in response to a waveform pattern of dual-mode drive signal CSEL2. For instance, as illustrated, the pulse interface circuit 351 may be configured to pass the dual-mode drive signal CSEL2 when dual-mode drive signal CSEL2 is provided as a pulse waveform (e.g., a pulse train). Additionally, the pulse interface circuit 351 may be configured to reject the dual-mode drive signal CSEL2 when the dual-mode drive signal CSEL2 is provided as a step function. Accordingly, the pulse interface circuit 351 may drive the gate of NFET M66 high according to a pulse waveform when the dual-mode drive signal CSEL2 is a pulse train; otherwise, the pulse interface circuit 351 may hold the gate of NFET M66 low when the dual-mode drive signal CSEL2 is not a pulse train.

Conversely, the gate capacitor C33 may be configured so that the select signal SEL2 may remain low when the dual-mode drive signal CSEL2 is provided as a pulse waveform and may transition high when the dual-mode drive signal CSEL2 is provided as a step function. Accordingly, by including the pulse interface circuit 351 and by controlling the timing (i.e., waveform) of dual-mode drive signal CSEL2, NFET M66 and NFET M6, may be independently controlled (i.e., turned on and off) using a single control signal (i.e., dual-mode drive signal CSEL2).

Figure 4A:
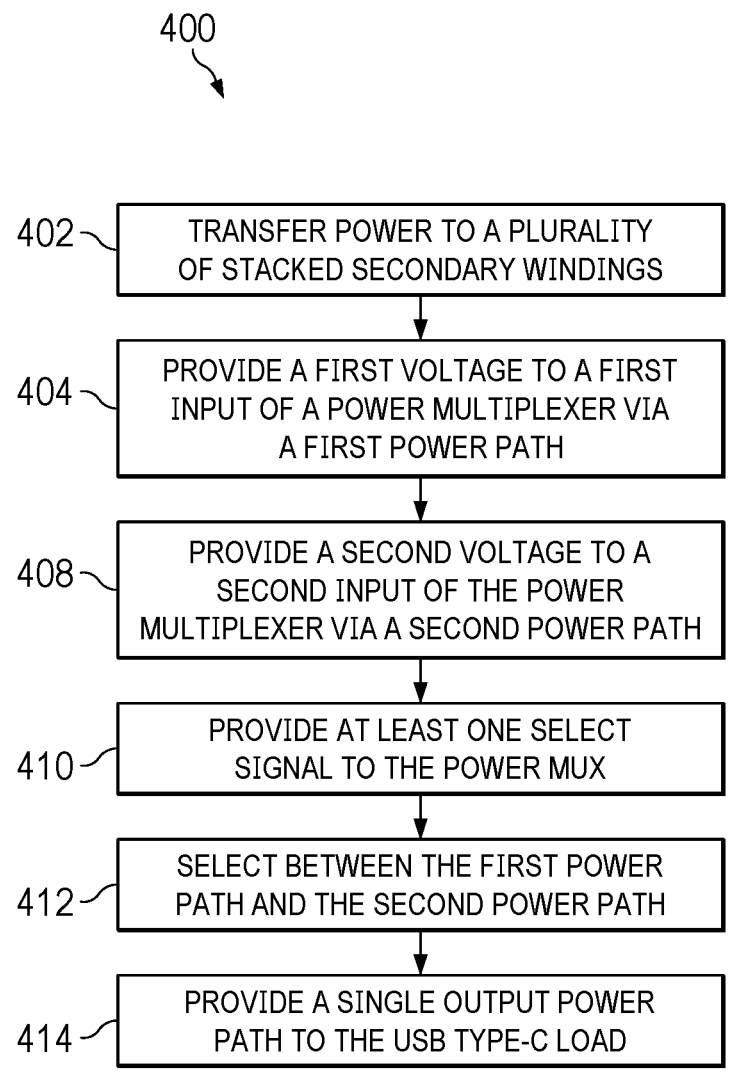
FIG. 4A illustrates a conceptual flow diagram for providing power to a load according to an embodiment.

FIG. 4A illustrates a conceptual flow diagram 400 for providing power to a load 106 according to an embodiment. Step 402 may correspond with transferring power to a plurality of stacked secondary windings (e.g., stacked secondary windings 113). Step 404 may correspond with providing a first voltage (e.g., voltage $V_A$) to a first input (e.g., first input INA) of a power MUX 117 via a first power path 131. Step 408 may correspond with providing a second voltage (e.g., voltage $V_B$) to a second input (e.g., second input INB) of a power MUX 117 via a second power path 133. Step 410 may correspond with providing at least one select signal (e.g., select signal SEL1 and/or select signal SEL2) to the power MUX 117. Step 412 may correspond to selecting between the first power path 131 and the second power path 133, based, at least in part, upon the at least one select signal. Step 414 may correspond to providing a single output power path 134 to the USB type-C load 119.

Figure 4B:
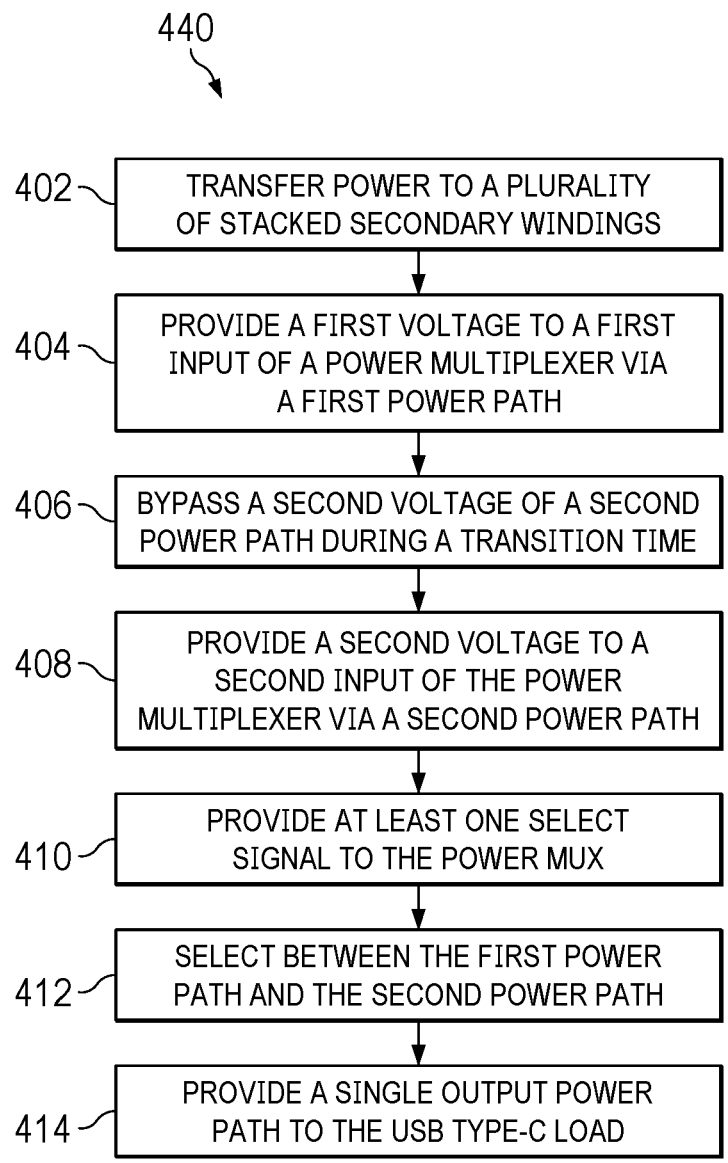
FIG. 4B illustrates a conceptual flow diagram for providing power to a load according to another embodiment.

FIG. 4B illustrates a conceptual flow diagram 440 for providing power to a load 106 according to another embodiment. The conceptual flow diagram 440 is like conceptual flow diagram 400, except it includes step 406 between step 404 and step 408. Step 406 may correspond with turning on transfer switch 240 during a transient while the output voltage $V_O$ varies. The transfer switch 240 may conduct during a transition time TRS.

Alternatively, and additionally, step 406 may correspond with using MUX switch 221 to provide an alternative (i.e., bypass) connection between the second input INB and the output OUT via the body diode of PFET M4.

Figure 5A:
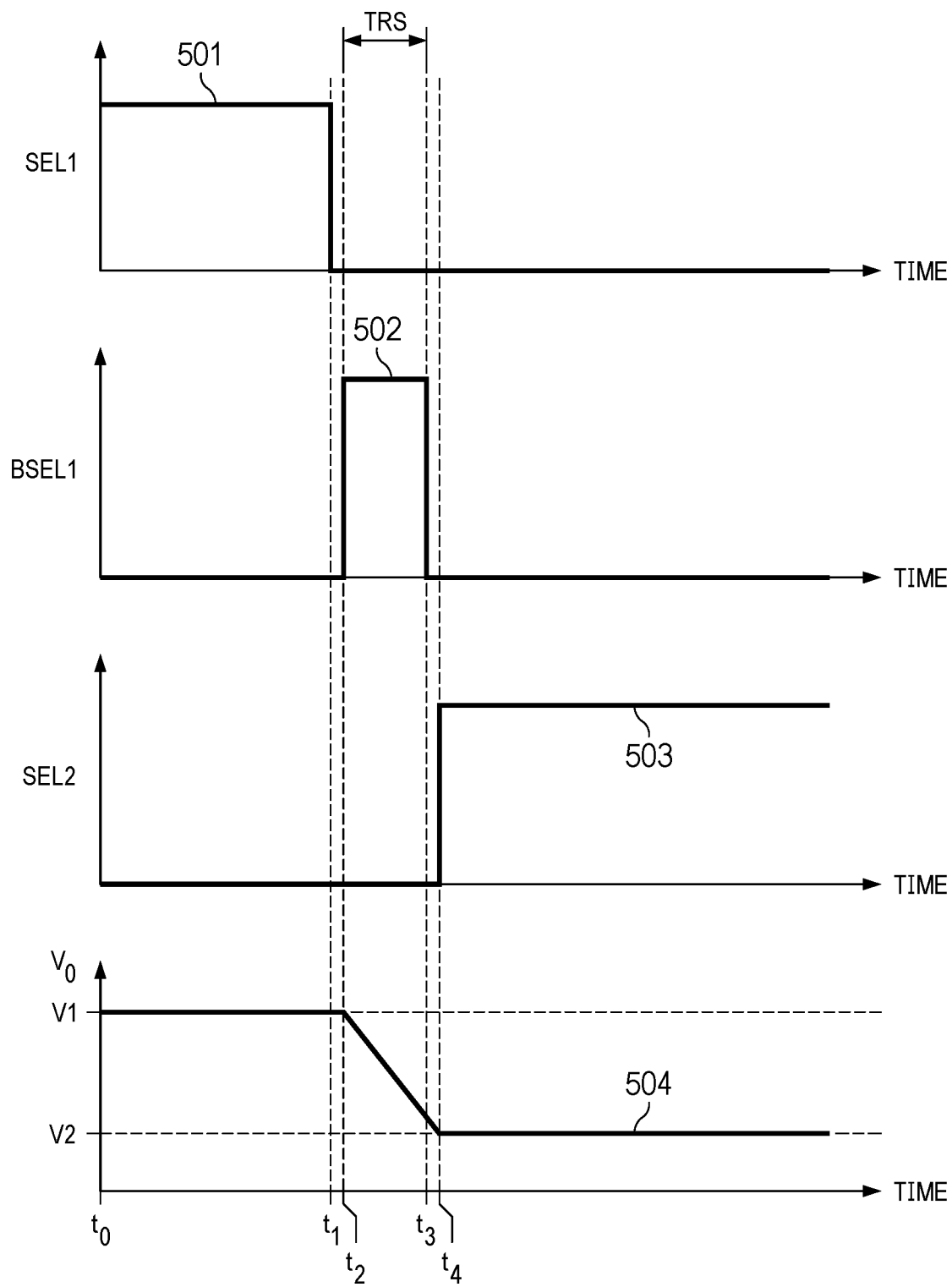
FIG. 5A illustrates waveforms according to an embodiment.

FIG. 5A illustrates waveforms 501-504 according to an embodiment. Waveforms 501-504 may correspond with select signal SEL1, bypass select signal BSEL1, select signal SEL2, and output voltage $V_O$, respectively.

During the interval from time t0 to time t1, the select signal SEL1 (i.e., waveform 501) may be exerted high so that the MUX switch 210 is on (i.e., conducts) and the output voltage $V_O$ (i.e., waveform 504) maintains a steady state voltage V1 (e.g., forty volts). Also, during the interval from time t0 to time t1, the bypass select signal BSEL1 (i.e., waveform 502) and the select signal SEL2 (i.e., waveform 503) may be exerted low so that the transfer switch 240 and the MUX switch 211 are off (i.e., block).

At time t1 the select signal SEL1 may be exerted low so that the MUX switch 210 turns off (i.e., blocks). From time t1 to time t2 the bypass select signal BSEL1 (i.e., waveform 502) and the select signal SEL2 (i.e., waveform 503) may be exerted low so that the transfer switch 240 and the MUX switch 211 are off (i.e., block). At time t2 the bypass select signal BSEL1 (i.e., waveform 502) may be exerted high.

During the interval from time t2 to time t3, the bypass select signal BSEL1 (i.e., waveform 502) may be exerted high so that the transfer switch 240 is on (i.e., conducts) and the output voltage $V_O$ (i.e., waveform 504) transitions from steady state V1 (e.g., forty volts) towards steady state voltage V2 (e.g., five volts). Also, during the interval from time t2 to time t3, the select signal SEL1 (i.e., waveform 501) and the select signal SEL2 (i.e., waveform 503) may be exerted low so that the MUX switch 210 and the MUX switch 211 are off (i.e., block).

The interval from time t2 to time t3 may be a transition time TRS. From time t2 to time t3 the output voltage $V_O$ (i.e., waveform 504) is in a transient state decreasing from steady state voltage V1 to steady state voltage V2. The transition time TRS may be determined, at least in part, by a time constant relating to the resistance of the bleeder resistor RB.

The transfer switch 240 may be configured to improve the transient of output voltage $V_O$ so that waveform 504 decreases monotonically within a specified tolerance (e.g., according to transient requirements of a USB PD 3.1 specification).

At time t3 the bypass select signal BSEL1 may be exerted low so that the transfer switch 240 turns off (i.e., blocks). From time t3 to time t4 the bypass select signal BSEL1 (i.e., waveform 502) and the select signal SEL2 (i.e., waveform 503) may be exerted low so that the transfer switch 240 and the MUX switch 211 are off (i.e., block). At time t4 the select signal SEL2 (i.e., waveform 503) may be exerted high.

Following time t4, the select signal SEL2 (i.e., waveform 503) may be exerted high so that the MUX switch 211 is on (i.e., conducts) and the output voltage $V_O$ (i.e., waveform 504) maintains the steady state voltage V2 (e.g., five volts). Also, following time t4, the select signal SEL1 (i.e., waveform 501) and the bypass select signal BSEL1 (i.e., waveform 502) may be exerted low so that the MUX switch 210 and the transfer switch 240 are off (i.e., block).

Figure 5B:
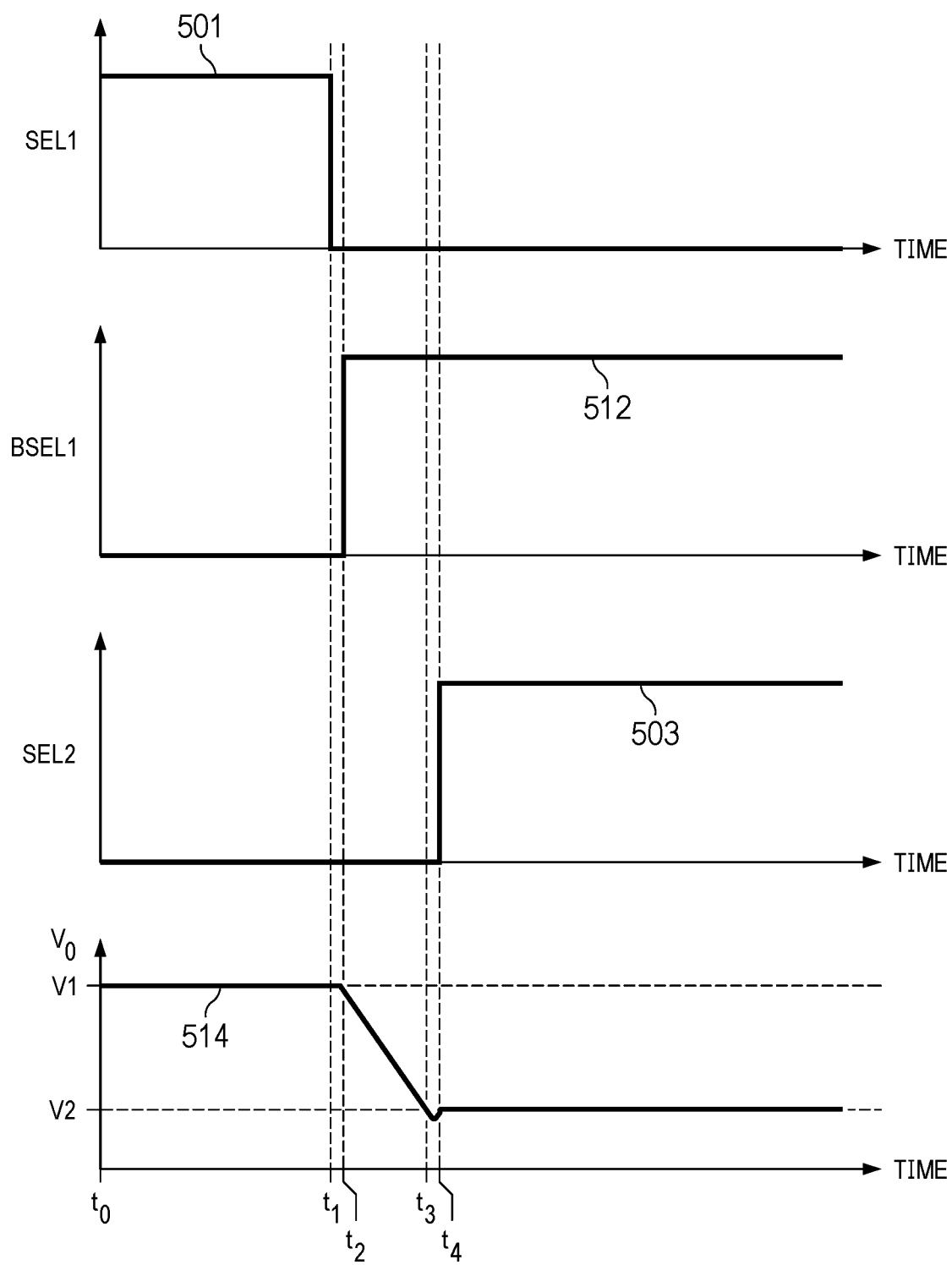
FIG. 5B illustrates waveforms according to another embodiment.

FIG. 5B illustrates waveforms 501, 512, 503, and 514 according to another embodiment. With reference to FIG. 2F, waveforms 501, 512, 503, and 514 may correspond with select signal SEL1, bypass select signal BSEL1, select signal SEL2, and output voltage $V_O$, respectively.

During the interval from time t0 to time t1, the select signal SEL1 (i.e., waveform 501) may be exerted high so that the MUX switch 210 is on (i.e., conducts) and the output voltage $V_O$ (i.e., waveform 514) maintains a steady state voltage V1 (e.g., forty volts). Also, during the interval from time t0 to time t1, the bypass select signal BSEL1 (i.e., waveform 512) and the select signal SEL2 (i.e., waveform 503) may be exerted low so that the MUX switch 221 is off (i.e., blocks).

At time t1 the select signal SEL1 may be exerted low so that the MUX switch 210 turns off (i.e., blocks). From time t1 to time t2 the bypass select signal BSEL1 (i.e., waveform 512) and the select signal SEL2 (i.e., waveform 503) may be exerted low so that the MUX switch 221 is off (i.e., blocks). At time t2 the bypass select signal BSEL1 (i.e., waveform 512) may be exerted high.

During the interval from time t2 to time t3, the bypass select signal BSEL1 (i.e., waveform 512) may be exerted high so that the so that the MUX switch 221 provides the alternative (i.e., bypass) connection between the second input INB and the output OUT via the body diode of PFET M4. In this manner the output voltage $V_O$ (i.e., waveform 514) may transition from steady state voltage V1 (e.g., forty volts) towards steady state voltage V2 (e.g., five volts). Also, the select signal SEL1 (i.e., waveform 501) and the select signal SEL2 (i.e., waveform 503) may be exerted low so that the MUX switch 210 is off. Additionally, the MUX switch 221 provides the alternative connection such that the body diode of PFET M4 is forward biased.

From time t2 to time t3 the output voltage $V_O$ (i.e., waveform 514) is in a transient state decreasing from steady state voltage V1 toward steady state voltage V2. The transition time TRS may be determined, at least in part, by a time constant relating to the resistance of the bleeder resistor RB.

The MUX switch 221 with NFET M90 may be configured to improve the transient of output voltage $V_O$ so that waveform 514 decreases monotonically within a specified tolerance (e.g., according to transient requirements of a USB PD 3.1 specification).

From time t3 to time t4 the output voltage $V_O$ may drop below the steady state voltage V1 due, at least in part, to a diode voltage drop associated with the body diode of PMOS M4.

Alternatively, following time t4, the select signal SEL2 (i.e., waveform 503) may be exerted high so that the MUX switch 221 is on (i.e., conducts) and the output voltage $V_O$ (i.e., waveform 514) maintains the steady state voltage V2 (e.g., five volts). Also, following time t4, the select signal SEL1 (i.e., waveform 501) may be exerted low so that the MUX switch 210 is off (i.e., block).

CONCLUSION

The above description of illustrated examples of the present disclosure, including what is described in the Abstract, are not intended to be exhaustive or to be limitation to the precise forms disclosed. While specific embodiments of, and examples for a switch mode power converter with selectable power paths are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings herein.

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A flyback converter comprising:
a plurality of stacked secondary windings comprising a first winding and a second winding; and
secondary side circuitry comprising:
a first power path electrically coupled to the first winding;
a second power path electrically coupled to the second winding; and
a power multiplexer (MUX) configured to select and transition between the first power path and the second power path to provide a single output power path to a load.

2. The flyback converter of claim 1, further comprising a multiplexer (MUX) bypass circuit electrically coupled to the power MUX and configured to bypass the power MUX during the transition between the first power path and the second power path to the load.

3. The flyback converter of claim 2, wherein the MUX bypass circuit comprises a transfer switch electrically coupled between the second power path and the single output power path and configured to bypass the power MUX for a transition time.

4. The flyback converter of claim 3, wherein the load comprises a bleeder resistor and the transition time is based, at least in part, upon a resistance of the bleeder resistor.

5. The flyback converter of claim 1, wherein the load comprises a universal serial bus (USB) type-C load.

6. The flyback converter of claim 1, wherein the power MUX is configured to select and transition between the first power path and the second power path in response to at least one select signal.

7. The flyback converter of claim 6, further comprising:
a secondary controller configured to provide the at least one select signal.

8. The flyback converter of claim 6, further comprising:
a power delivery controller (PDC) configured to provide the at least one select signal.

9. The flyback converter of claim 1, wherein the first power path provides a first power less than or equal to two hundred and forty watts (240 W).

10. The flyback converter of claim 9, wherein the second power path provides a second power less than or equal to one hundred watts (100 W).

11. The flyback converter of claim 1, wherein the power MUX comprises a MUX switch.

12. The flyback converter of claim 11, wherein the MUX switch comprises a first P-channel field effect transistor (PFET).

13. The flyback converter of claim 12, wherein the MUX switch comprises an N-channel field effect transistor (NFET) coupled to control a gate of the first PFET in response to a select signal.

14. The flyback converter of claim 13, wherein the MUX switch further comprises a second PFET, and wherein the first PFET and the second PFET are electrically coupled in a back-to-back switch configuration.

15. The flyback converter of claim 14, wherein the MUX switch further comprises a second NFET electrically coupled to the second PFET.

16. A flyback converter comprising:
an energy transfer element comprising a plurality of stacked secondary windings; and
secondary side circuitry comprising:
a power multiplexer (MUX) comprising a first input and a second input and configured to provide an output voltage to a load, wherein the output voltage is selected from at least two input voltages, and wherein the at least two input voltages comprise a first voltage and a second voltage;
a first power path configured to provide the first voltage; and
a second power path configured to provide the second voltage.

17. The flyback converter of claim 16, wherein the first power path is electrically coupled between the plurality of stacked secondary windings and the first input.

18. The flyback converter of claim 16, wherein the second power path is electrically coupled between the plurality of stacked secondary windings and the second input.

19. The flyback converter of claim 16, wherein the load comprises a universal serial bus (USB) type-C load.

20. The flyback converter of claim 19, wherein the power MUX is configured to provide the output voltage in response to at least one select signal.

21. The flyback converter of claim 20, further comprising:
a secondary controller configured to provide the at least one select signal to the power MUX.

22. The flyback converter of claim 20, further comprising:
a power delivery controller (PDC) configured to provide the at least one select signal to the power MUX.

23. The flyback converter of claim 22, further comprising:
a bleed resistor electrically coupled in series with an NFET; and
a pulse interface circuit configured to drive a gate of the NFET in response to a waveform of a dual-mode drive signal.

24. A method of providing output power to a universal serial bus (USB) type-C load comprising:
operating a flyback converter to transfer power to a plurality of stacked secondary windings;
providing a first voltage to a first input of a power multiplexer (MUX) via a first power path coupled to the plurality of stacked secondary windings;
providing a second voltage to a second input of the power MUX via a second power path coupled to the plurality of stacked secondary windings;
providing at least one select signal to the power MUX;
selecting between the first power path and the second power path based, at least in part, upon the at least one select signal; and providing a single output power path to the USB type-C load.

25. The method of claim 24, further comprising:
bypassing the second voltage to the second input of the power MUX.

26. The method of claim 25, further comprising:
bypassing the second voltage to the second input of the power MUX via a multiplexer (MUX) bypass circuit.

27. The method of claim 26, wherein bypassing the second voltage to the second input of the power MUX via the MUX bypass circuit further comprises:
bypassing the second voltage to the second input of the power MUX via the MUX bypass circuit during a transition time.

28. The method of claim 27, wherein the transition time is based, at least in part, upon a resistance of a bleeder resistor.

29. The method of claim 24, wherein providing the at least one select signal to the power MUX comprises:
providing the at least one select signal from a secondary controller.

30. The method of claim 24, wherein providing the at least one select signal to the power MUX comprises:
providing the at least one select signal from a power delivery controller (PDC).

31. The method of claim 24, wherein providing the first voltage to the first input of the power MUX via the first power path coupled to the plurality of stacked secondary windings comprises:
regulating the first voltage.

32. The method of claim 24, wherein providing the second voltage to the second input of the power MUX via the second power path coupled to the plurality of stacked secondary windings comprises:
regulating the second voltage.

\* \* \* \* \*